United States Patent
Prasad et al.

(10) Patent No.: US 12,463,810 B2
(45) Date of Patent: Nov. 4, 2025

(54) ESTABLISHING SESSIONS VIA A PROXY SERVICE

(71) Applicant: OKTA, INC., San Francisco, CA (US)

(72) Inventors: Smitha Prasad, San Jose, CA (US);
Mario John Villaplana, San Antonio, TX (US); Sajan Andrew Alexander, Shaker Heights, OH (US); Mahesh Keralapura Manjunatha, Fremont, CA (US); Swaroop Katika, Gainsville, FL (US); Evan Moses, San Francisco, CA (US); Zheng Chen, Toronto (CA); Phoebe Yu, Piedmont, CA (US)

( * ) Notice: Subject to any disclaimer, the term of this patent is extended or adjusted under 35 U.S.C. 154(b) by 134 days.

(21) Appl. No.: 18/403,217

(22) Filed: Jan. 3, 2024

(65) Prior Publication Data
US 2025/0219821 A1    Jul. 3, 2025

(51) Int. Cl.
*H04L 9/32* (2006.01)
*H04L 9/08* (2006.01)
*H04L 9/30* (2006.01)

(52) U.S. Cl.
CPC ............. *H04L 9/32* (2013.01); *H04L 9/088* (2013.01); *H04L 9/30* (2013.01)

(58) Field of Classification Search
CPC ........................................................ H04L 9/32
See application file for complete search history.

(56) References Cited

U.S. PATENT DOCUMENTS

| | | | | |
|---|---|---|---|---|
| 8,073,777 B2* | 12/2011 | Barry | ............ | H04M 15/745 705/50 |
| 2009/0106551 A1* | 4/2009 | Boren | ............ | H04L 9/321 380/259 |
| 2016/0285832 A1* | 9/2016 | Petrov | ............ | H04L 67/60 |
| 2021/0036871 A1* | 2/2021 | Omori | ............ | H04L 9/3268 |

* cited by examiner

*Primary Examiner* — Bradley W Holder
(74) *Attorney, Agent, or Firm* — Holland & Hart LLP

(57) ABSTRACT

A method for managing sessions with an application server via an identity management system is described. The method may include receiving, via an application protocol interface (API) of a cloud service of the identity management system, a first request associated with a first user for user access to an account of the application server. The API may transmit a second request for a secrets service to encrypt a password associated with the first user to a public key of a keypair. The API may receive a message including the encrypted password and forward the encrypted password to an end-client. The identity management system may establish a session on behalf of the first user for the account of the application server based on the end-client having access to a private key of the keypair.

20 Claims, 13 Drawing Sheets

ESTABLISHING SESSIONS VIA A PROXY SERVICE

FIELD OF TECHNOLOGY

The present disclosure relates generally to identity management, and more specifically to establishing sessions via a proxy service.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

A user of an organization may use a plaintext password to log into a user account for access to a resource of the organization. However, the use of plaintext passwords for logging into user accounts may lead to security vulnerabilities for the organization. For example, a malicious actor may obtain a plaintext password and use the obtained plaintext password to gain unauthorized access to resources of the organization.

SUMMARY

The described techniques relate to improved methods, systems, devices, and apparatuses that support establishing sessions via a proxy service. For example, such techniques may provide a framework for establishing a session with an application server for an account of the application server without revealing a plaintext password to a user requesting access to the account. In some examples, an identity management system may provide an encrypted password to a software client on a device of the user, such that the software client may use the encrypted password to establish a session with the application server. In some other examples, the identity management system may use the encrypted password to establish a session with the application server on behalf of the software client via a gateway. For example, the identity management system may receive a first request for access to the account from a first user via an application protocol interface (API). In response to receiving the first request, the identity management system may transmit a second request to a secrets service of the identity management system to encrypt a password associated with the first user. The secrets service may respond to the second request with the encrypted password according to whether the first user has access to the account. For example, the secrets service may refrain from providing the encrypted password if the first user does not have access to the account.

The identity management system may provide the encrypted password to an end-client (e.g., a software client on a device associated with the first user or a gateway device) for establishing the session with the application server. For example, the identity management system may provide the encrypted password to the software client, such that the software client may use the encrypted password to establish (e.g., directly establish) the session with the application for the first user. Alternatively, the identity management system may provide the encrypted password to the gateway device, such that the gateway device may establish the session with the application server on behalf of the software client. By providing the encrypted password to the end-client, the identity management system may refrain from revealing the plaintext password, which may lead to increased security, among other benefits. Additionally, or alternatively, the identity management system may grant access to the first user based on one or more labels associated with the first user. For example, the identity management system may generate labels associated with the application server and grant access to accounts of the application server based on comparing the labels associated with the user requesting access with the labels of the application server.

A method for managing sessions with an application server via an identity management system by an apparatus is described. The method may include receiving, via an API of a cloud service of the identity management system, a first request for user access to an account of the application server, where the first request is associated with a first user of the account, transmitting, via the access point (API) and in response to the first request, a second request for a secrets service associated with the identity management system to encrypt a password associated with the first user to a public key of a keypair, where the first request includes an indication of the public key, receiving, via the API and in response to the second request, a first message including the encrypted password, where the first message is received from the secrets service, transmitting, via the API in response to the first message, a second message including at least the encrypted password, where the second message is transmitted to an end-client that is associated with the identity management system and that has access to a private key of the keypair, and establishing, at the end-client on behalf of the first user, a session for the account of the application server, where establishing the session is based on the end-client having access to the private key.

An apparatus for managing sessions with an application server via an identity management system is described. The apparatus may include one or more memories storing processor executable code, and one or more processors coupled with the one or more memories. The one or more processors may individually or collectively operable to execute the code to cause the apparatus to receive, via an API of a cloud service of the identity management system, a first request for user access to an account of the application server, where the first request is associated with a first user of the account, transmit, via the API and in response to the first request, a second request for a secrets service associated with the identity management system to encrypt a password associated with the first user to a public key of a keypair, where the first request includes an indication of the public key, receive, via the API and in response to the second request, a first message including the encrypted password, where the first message is received from the secrets service, transmit, via the API in response to the first message, a second message including at least the encrypted password, where the second message is transmitted to an end-client that is associated with the identity management system and that has access to a private key of the keypair, and establish, at the end-client on behalf of the first user, a session for the account of the application server, where establishing the session is based on the end-client having access to the private key.

Another apparatus for managing sessions with an application server via an identity management system is described. The apparatus may include means for receiving, via an API of a cloud service of the identity management system, a first request for user access to an account of the application server, where the first request is associated with a first user of the account, means for transmitting, via the API and in response to the first request, a second request for a secrets service associated with the identity management system to encrypt a password associated with the first user to a public key of a keypair, where the first request includes an indication of the public key, means for receiving, via the API and in response to the second request, a first message including the encrypted password, where the first message is received from the secrets service, means for transmitting, via the API in response to the first message, a second message including at least the encrypted password, where the second message is transmitted to an end-client that is associated with the identity management system and that has access to a private key of the keypair, and means for establishing, at the end-client on behalf of the first user, a session for the account of the application server, where establishing the session is based on the end-client having access to the private key.

A non-transitory computer-readable medium storing code for managing sessions with an application server via an identity management system is described. The code may include instructions executable by one or more processors to receive, via an API of a cloud service of the identity management system, a first request for user access to an account of the application server, where the first request is associated with a first user of the account, transmit, via the API and in response to the first request, a second request for a secrets service associated with the identity management system to encrypt a password associated with the first user to a public key of a keypair, where the first request includes an indication of the public key, receive, via the API and in response to the second request, a first message including the encrypted password, where the first message is received from the secrets service, transmit, via the API in response to the first message, a second message including at least the encrypted password, where the second message is transmitted to an end-client that is associated with the identity management system and that has access to a private key of the keypair, and establish, at the end-client on behalf of the first user, a session for the account of the application server, where establishing the session is based on the end-client having access to the private key.

In some examples of the method, apparatus, and non-transitory computer-readable medium described herein, the end-client includes a software client on a device associated with the first user.

In some examples of the method, apparatus, and non-transitory computer-readable medium described herein, the first request may be associated with the first user of the account and includes the public key of the keypair, and where the session may be established between the end-client and the application server based on the first request including the public key.

In some examples of the method, apparatus, and non-transitory computer-readable medium described herein, decrypting, via the private key of the keypair and at the software client, the encrypted password, where establishing the session may be based on decrypting the encrypted password.

In some examples of the method, apparatus, and non-transitory computer-readable medium described herein, the end-client includes a gateway associated with the identity management system.

In some examples of the method, apparatus, and non-transitory computer-readable medium described herein, transmitting the second message may include operations, features, means, or instructions for transmitting the second message to a software client on a device associated with the first user, where the second message further includes a certificate usable by the software client for establishing a connection between the software client and the end-client, receiving, at the gateway and from the device, the second message including the encrypted password and the certificate, and establishing the connection with the software client based on the certificate, where establishing the session on behalf of the first user may be based on establishing the connection with the software client.

In some examples of the method, apparatus, and non-transitory computer-readable medium described herein, decrypting, at the gateway and using the private key of the keypair, the encrypted password on behalf of the first user, where establishing the session on behalf of the first user may be based on decrypting the encrypted password.

In some examples of the method, apparatus, and non-transitory computer-readable medium described herein, transmitting the second message may include operations, features, means, or instructions for determining, via the API, that the first user may be one of the set of multiple users having access to the application server, where the second message includes the certificate based on the determining.

Some examples of the method, apparatus, and non-transitory computer-readable medium described herein may further include operations, features, means, or instructions for accessing a database associated with the gateway to retrieve the public key of the keypair, where transmitting the first message may be based on accessing the database.

Some examples of the method, apparatus, and non-transitory computer-readable medium described herein may further include operations, features, means, or instructions for determining, via the end-client, that the first user may be one of a first set of multiple users having access to the application server at a first time, where establishing the session may be based on the first user having access to the application server at the first time.

Some examples of the method, apparatus, and non-transitory computer-readable medium described herein may further include operations, features, means, or instructions for determining, at a second time after establishing the session, that the first user may be not one of a second set of multiple users having access to the application server at the second time and terminating the session based on the first user not having access to the application server at the second time.

A method for managing sessions with an application server via an identity management system by an apparatus is described. The method may include generating one or more first labels associated with the application server, receiving, via an API of a cloud service of the identity management system, a first request for access to an account of the application server, where the first request is associated with a first user of the account, and where the first user is associated with a set of multiple labels, and determining whether the set of multiple labels includes the one or more first labels associated with the application server, where granting the first user access to the account of the application server is based on the determining.

An apparatus for managing sessions with an application server via an identity management system is described. The apparatus may include one or more memories storing processor executable code, and one or more processors coupled with the one or more memories. The one or more processors may individually or collectively operable to execute the code to cause the apparatus to generate one or more first labels associated with the application server, receive, via an API of a cloud service of the identity management system, a first request for access to an account of the application server, where the first request is associated with a first user of the account, and where the first user is associated with a set of multiple labels, and determine whether the set of multiple labels includes the one or more first labels associated with the application server, where granting the first user access to the account of the application server is based on the determining.

Another apparatus for managing sessions with an application server via an identity management system is described. The apparatus may include means for generating one or more first labels associated with the application server, means for receiving, via an API of a cloud service of the identity management system, a first request for access to an account of the application server, where the first request is associated with a first user of the account, and where the first user is associated with a set of multiple labels, and means for determining whether the set of multiple labels includes the one or more first labels associated with the application server, where granting the first user access to the account of the application server is based on the determining.

A non-transitory computer-readable medium storing code for managing sessions with an application server via an identity management system is described. The code may include instructions executable by one or more processors to generate one or more first labels associated with the application server, receive, via an API of a cloud service of the identity management system, a first request for access to an account of the application server, where the first request is associated with a first user of the account, and where the first user is associated with a set of multiple labels, and determine whether the set of multiple labels includes the one or more first labels associated with the application server, where granting the first user access to the account of the application server is based on the determining.

In some examples of the method, apparatus, and non-transitory computer-readable medium described herein, generating the one or more first labels may include operations, features, means, or instructions for generating the one or more first labels as part of an enrollment process for the application server.

In some examples of the method, apparatus, and non-transitory computer-readable medium described herein, generating the one or more first labels may include operations, features, means, or instructions for authenticating the application server via the identity management system, where generating the one or more first labels may be based on the authenticating.

Some examples of the method, apparatus, and non-transitory computer-readable medium described herein may further include operations, features, means, or instructions for determining that the set of multiple labels includes the one or more first labels associated with the application server and granting, at a first time in response to the first request, the first user access to the account of the application server based on the set of multiple labels including the one or more first labels.

Some examples of the method, apparatus, and non-transitory computer-readable medium described herein may further include operations, features, means, or instructions for generating, at a second time after the first time, one or more second labels associated with the application server, determining that the set of multiple labels does not include the one or more second labels associated with the application server, and revoking access by the first user to the account of the application server based on the set of multiple labels not including the one or more second labels.

In some examples of the method, apparatus, and non-transitory computer-readable medium described herein, the one or more first labels include an operating system of the application server, an identifier of a cloud account associated with the application server, a hostname associated with the application server, a cloud provider of the application server, or any combination thereof.

DETAILED DESCRIPTION

Figure 1:
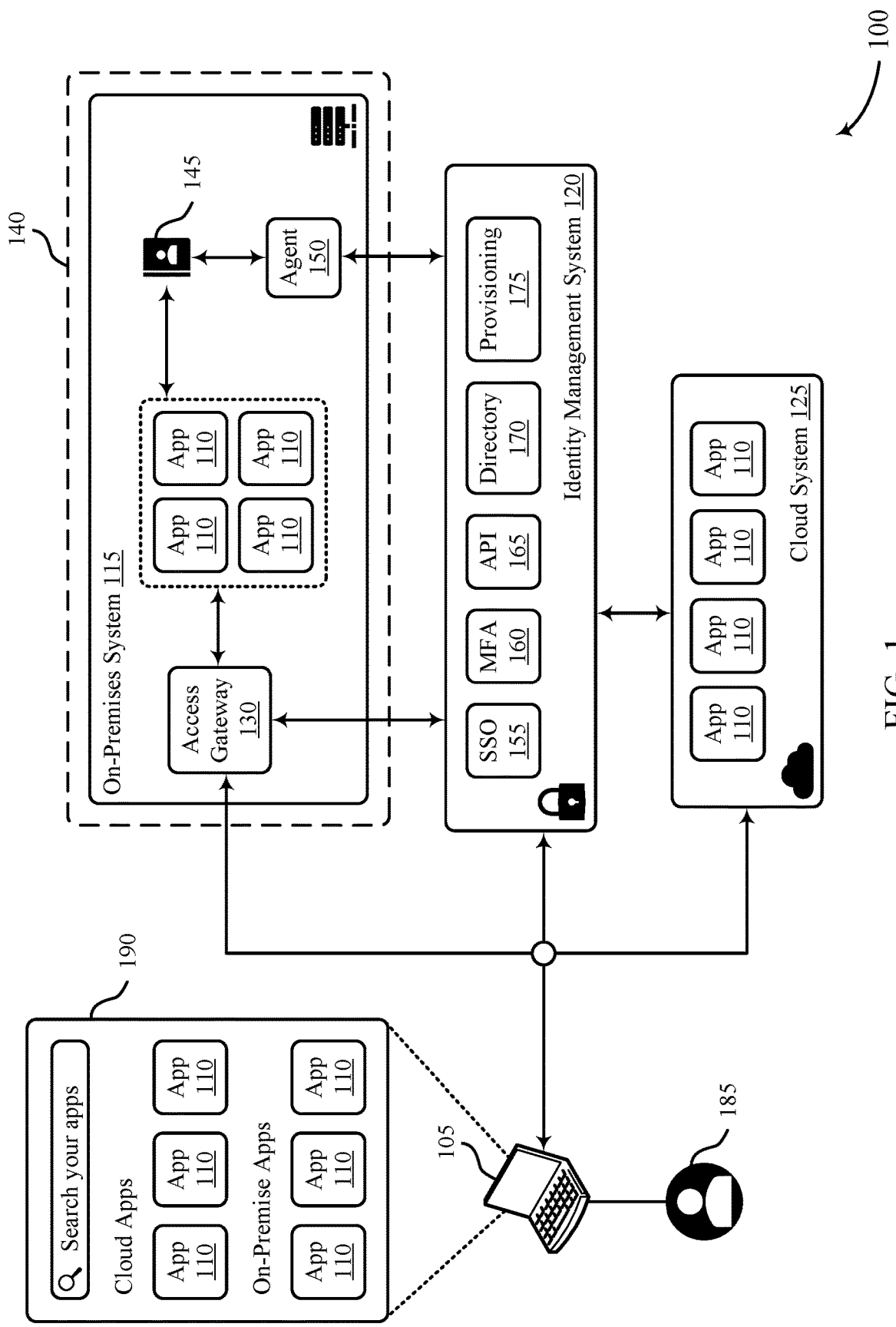
FIGS. 1 and 2 show examples of computing systems that support establishing sessions via a proxy service in accordance with aspects of the present disclosure.

An identity management system may manage access to one or more accounts of one or more application servers. For example, the identity management system may grant access and/or revoke access to accounts based on requests associated with the account (e.g., requests for access to the account, login requests, in-session requests, etc.). In some examples, the identity management system may receive requests for access to an account. For example, the identity management system may manage sessions between clients and an application server, where the account is of the application server. That is, an organization may have multiple accounts with an application server and may use the identity management system to manage user access to the multiple accounts. Additionally, or alternatively, the identity management system or a service of the identity management system may support password management. For example, the organization may also use the identity management system to manage passwords for various users of the organization. The identity management system may include a password management service, which may store one or more passwords for one or more users of the organization. The one or more passwords may be used for accessing one or more of the accounts the organization has with the application server.

In some examples, the password management service may provide the password for the account to one or more of the multiple users based on receiving the requests. For example, the password management service may provide the password to the user (e.g., directly or via a software client on a device of the user), for establishing a session with the application server. However, directly sharing the password with the user may be associated with a security risk. For example, if the device of the user is compromised, an attacker may gain access to the password.

Additionally, or alternatively, the account may be shared by multiple users. When the account is shared by multiple users, revoking access to the account may affect multiple users. That is, the identity management system may revoke access to an entire account based on detecting a security threat from a single user (e.g., or a subset of users of the account). Additionally, in some cases, administrators of the application server may create and update access policies manually. An access policy for an account may indicate which members of the organization are permitted to access the account. For example, an access policy may indicate that a subset of members of the organization (e.g., in a department of the organization, working on a project) are authorized to access the account. In some cases, however, manually creating or updating access policies may lead to one or more security vulnerabilities. For example, administrators may unintentionally (e.g., due to human error) grant access to some members, withhold access to some members, or both. Additionally, in some cases, the administrators may manually change an access policy and/or labels of users and of the application server when changes occur. Manually changing the access policy and/or the labels may be associated with high latency.

Various aspects of the present disclosure relate to securely establishing sessions with the application server. For example, aspects of the disclosure relate to establishing sessions via a proxy, establishing sessions based on labels, and terminating sessions. In some examples, the identity management system may receive requests for access to the account of the application server and, via a secrets service of the identity management system, generate an encrypted password. As described herein, the secrets service is isolated compute environment, which the identity management system may use to store (e.g., and generate) sensitive data, such as personally identifiable information (PII), passwords, and the like. In some examples, the identity management system may use the secrets service to store passwords (e.g., plaintext passwords) and generate encrypted passwords from an encryption key (e.g., one or more keys of a keypair). In other words, the secrets service may store and encrypt passwords for the identity management system to support secure access to accounts without revealing plaintext passwords to users. The identity management system may provide the encrypted password to an end-client and establish a session at the end-client on behalf of the first user. In some examples, the end-client may be a software client on a device associated with the first user. As described herein, a software client may refer to software (e.g., code) installed (e.g., locally) on a device of a user. The software client may have access to one or more keys, such as a private key of a keypair, that may be used to encrypt the password. In some other examples, the end-client may be a gateway associated with the identity management system. As described herein, a gateway (also referred to as an access gateway) may refer to virtual application (e.g., a reverse proxy-based virtual application) that integrates with other application (e.g., using an HTTP protocol) and provides authentication (e.g., uniform resource locator-based (URL-based) authentication). In some examples, a gateway may be behind the firewall, and enable external users access on-premises web-based applications without a virtual private network (VPN). In some cases, the gateway may be a device external to (e.g., separate from) the software client and/or the device of the first user.

The gateway may establish sessions with the application server on behalf of the first user, and, in some examples, may be supported by the identity management system.

Providing the encrypted password to the end-client for establishing the session may lead to increased security. For example, by providing the encrypted password, the identity management system may refrain from revealing a plaintext password to the first user. For example, the identity management system may receive the encrypted password from the secrets service and, rather than providing the plaintext password, may provide the encrypted password to the end-client. The identity management system may refrain from providing the plaintext password to the end-client to reduce a likelihood of an attacker intercepting the password (e.g., through a phishing attack). The establishment of sessions with the application server using one or more of the implementations described herein may support improved security. For example, establishing the session on behalf of the user, either via the software client or via the gateway, using an encrypted password may reduce a likelihood of a plaintext password being obtained by a malicious attacker. Additionally, establishing the session on behalf of the user may enable the identity management system to terminate sessions based on changes to security policies. For example, the identity management system may support the software client and/or the gateway by which the identity management system may terminate sessions, for example, if the user is no longer authorized to access the account.

Additionally, or alternatively, the identity management system may grant access to the first user based on comparing labels associated with the user to labels associated with the application server. For example, the identity management system may generate labels associated with the application server to be used to grant access. The use of labels described herein may support improved security. That is, granting and/or terminating access according to labels associated with the application server and the user may support flexibility and reduced latency when, for example, changes to a security policy are made. For example, the identity management system may update labels (e.g., automatically, autonomously) for the application server or the users based on changes to the policy. By updating labels for the application server or the users based on changes to the policy, the identity management system may reduce a likelihood of (e.g., may avoid) an administrator making manual changes to labels, which may reduce a likelihood of servers or users being assigned incorrect labels, thereby improving security.

In some examples, the identity management system may terminate sessions based on determining that the first user is not one of a set of users authorized to access the account. For example, the identity management system may periodically check whether the user is authorized to access the application server at one or more times after establishing the session. In-session termination described herein may support improved security. For example, the identity management system may terminate a session for the first user without affecting access for one or more other users of the account.

Aspects of the disclosure are initially described in the context of computing systems. Aspects of the disclosure are also described in the context of process flows. Aspects of the disclosure are further illustrated by and described with reference to apparatus diagrams, system diagrams, and flowcharts that relate to establishing sessions via a proxy service.

FIG. 1 illustrates an example of a computing system 100 that supports establishing sessions via a proxy service in accordance with various aspects of the present disclosure.

The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The identity management system 120 may manage sessions for the application server. In some examples, the identity management system 120 may manage the sessions for the application server by establishing sessions for the user 185 with the application server via a proxy. As described herein, the proxy may be referred to or used interchangeably with an "end-client." For example, the identity management system 120 may establish sessions via a proxy where a password of the account is not revealed to the user 185. In some examples, the user 185 may request to access a user account associated with the identity management system 120. For example, the identity management system 120 may receive the request via an API of a cloud service, such as the cloud system 125, where the request is received from the user 185 (e.g., via the computing device 105). The user account may be an account of an application server, such as an application server supporting one or more of the applications 110 on the computing device 105 of the user 185. Additionally, or alternatively, the identity management system 120 may establish and/or terminate the sessions based on whether the user 185 has access to the account. In some examples, the identity management system 120 may determine whether the user 185 has access to the account based on generated labels associated with the application server.

Figure 2:
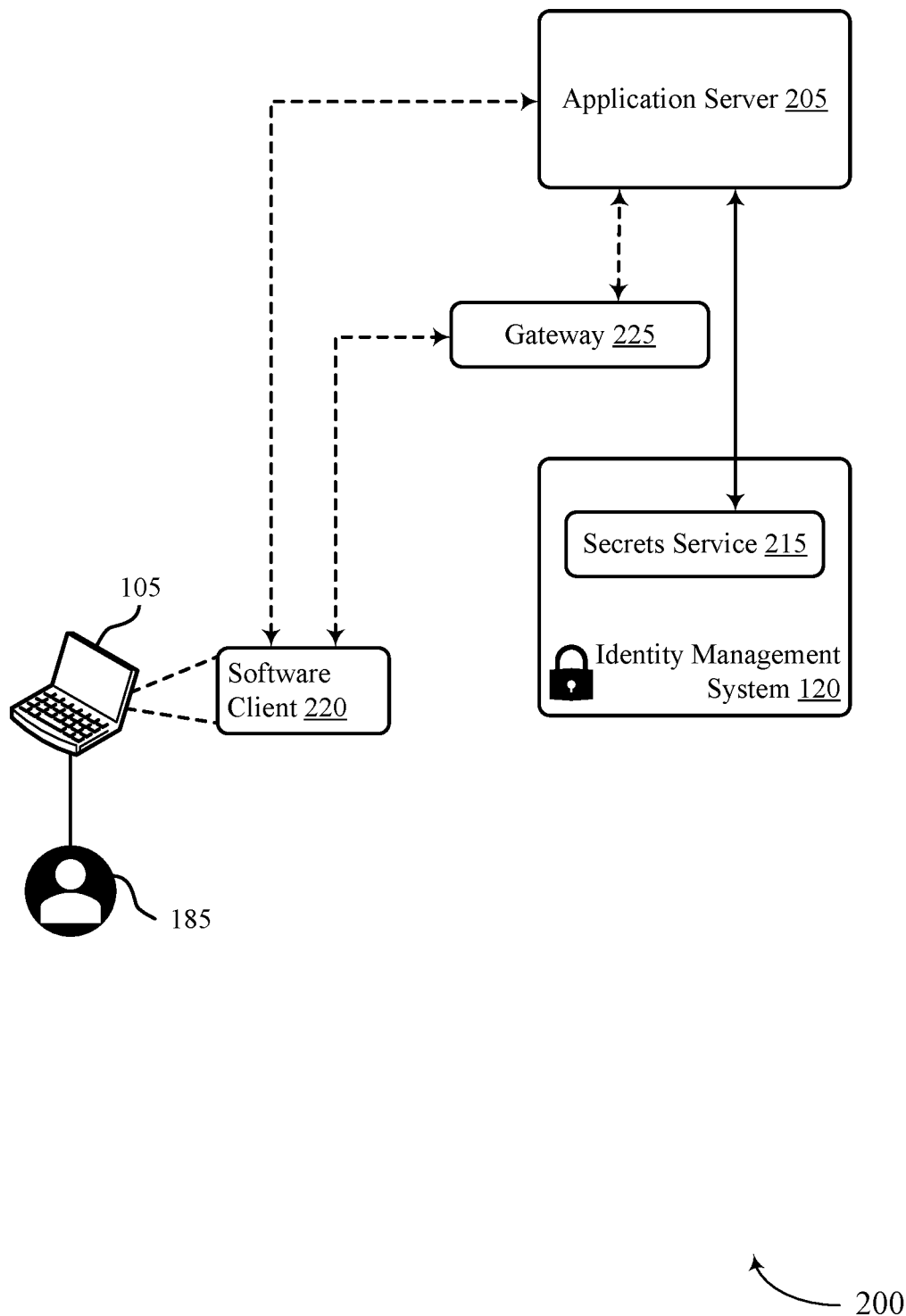

FIG. 2 shows an example of a computing system 200 that supports establishing sessions via a proxy service in accordance with aspects of the present disclosure. In some examples, the computing system 200 may implement or be implemented by aspects of the computing system 100. For example, the computing system 200 may include a computing device 105, an identity management system 120, and a user 185, which may be examples of corresponding devices as described with reference to FIG. 1.

The user 185 may, via the computing device 105, request to access an account of the application server 205. For example, the user 185 may request to access the account via an API. In some examples, the identity management system 120 may manage access to the application server 205. The identity management system 120 may receive the request via the API. In some examples, in order to establish a session and/or maintain a session with the application server 205, the user 185 may be authenticated via the identity management system 120. As an example, the identity management system 120 may determine that the user 185 is one of a set of users authorized to have access to the account of the application server 205. In some examples, the identity management system 120 may verify that the user 185 is authorized to access the application server via an API. Additionally, or alternatively, the identity management system 120 may verify that the user 185 is authorized to access the application server based on comparing labels associated with the user 185 to labels associated with the application server 205.

For example, the identity management system 120 may generate labels for the application server 205, the user 185, or both. In some examples, the labels may include an operating system of the application server 205, an identifier of a cloud account associated with the application server 205, a hostname associated with the application server 205, a cloud provider of the application server 205, or the like. To determine whether the user 185 has access to the account, the identity management system 120 may compare the labels of the user 185 to the labels of the application server 205.

After verifying that the user 185 has access to the account, the identity management system 120 may facilitate establishment of a session for the user 185 with the application server 205. For example, the identity management system 120 may establish the session after the user 185 (e.g., using the computing device 105) connects to the application server 205 (e.g., via an API). The application server 205 may request credentials (e.g., a password) from the secrets service 215 of the identity management system 120 for the user 185 to log into the application server 205. The credentials may flow (e.g., in an encrypted form) through the application server 205 to the software client 220. In some examples, the software client 220 may present the credentials to the gateway 225 which may use the credential to log into the application server 205, or, in some other examples, the software client 220 may use the credentials to log into the application server 205 (e.g., directly).

For example, the identity management system 120 may generate an encrypted password associated with the user 185 via a secrets service 215. In other words, the identity management system 120 may send a request to the secrets service 215 to encrypt the password associated with the user 185. In some examples, the secrets service 215 may encrypt the password using a key (e.g., a symmetric key, a public key of an asymmetric keypair). For example, the request to encrypt the password may include an indication of the public key or an indication of how the password is to be encrypted (e.g., a reveal format). In other words, the request may include an indication of how the password may be revealed (e.g., how to encrypt a password, how the password is to be decrypted). Further, the request may include the information to encrypt the password according to the indicated format. As an example, if the password is to be encrypted to the public key, the request may include an indication of the public key or may include the public key itself. In some examples, an end-client to receive the encrypted password may have access to a private key of the keypair such that the end-client may decrypt and use the password. In other words, the password may be encrypted such that a user or entity with access to the private key (e.g., only) of the keypair may use the password to login to the account of the application server 205.

In other words, the secrets service 215 may store the password, which may not be revealed to the end-client in an unencrypted form. For example, the secrets service 215 may send hashed passwords with a secure hash function, or, in other examples, the encrypted password with the private key. The secrets service 215 may store periodically rotating passwords which, in some examples, may be passwords for an account used by multiple users. In some examples, the secrets service 215 may rotate (e.g., change) a password based on a quantity of encrypted passwords provided by the secrets service 215, a duration of time since the password is set, or the like. As an example, the secrets service 215 may change the password for the account after the nth (e.g., every nth) encrypted password provided to the identity management system 120.

After encrypting the password, the secrets service 215 may return the encrypted password to the identity management system 120. In some examples, the user 185 may obtain a certificate via the API (e.g., the API may produce a certificate associated with the user 185 and provide the certificate to the user 185). For example, the user 185 may send the certificate and the encrypted password to a proxy service, such as a gateway 225 of the identity management system 120, to establish a session with the application server 205 on behalf of the user 185. In other words, the user 185 may prove, to the gateway 225 and in order to establish the session, that the user 185 has access to the account by sending the certificate. That is, the secrets service 215 may generate the certificate after checking that the user 185 has access to the account such that the user 185 may provide the certificate to the gateway 225 to establish the session.

The identity management system 120 may establish the session on behalf of the user 185 at an end-client (e.g., a proxy service). In some examples, the end-client may be a software client 220 on the computing device 105 of the user 185, or, in some other cases, the end-client may be the gateway 225. For example, the identity management system 120 may send at least the encrypted password to the end-client, where the end-client has access to the private key of the keypair. In some examples, the user 185 may have access to the private key, or, in some other examples, the gateway 225 may have access to the private key. In either example, the identity management system 120 may establish the session after either the software client 220 or the gateway 225 has decrypted the encrypted password using the private key. In other words, the software client 220 or the gateway 225 may input the decrypted password to the application server 205 to establish the session via the identity management system 120.

After establishing the session, the identity management system 120 may monitor whether the user 185 has access to the account. In other words, the identity management system 120 may monitor whether access to the account for the user 185 has been revoked. In some examples, the identity management system 120 may monitor the labels of the application server 205, the user 185, or both. That is, the identity management system 120 may periodically compare the labels of the application server 205 to the labels of the user 185 to determine whether or not to terminate the session. For example, the identity management system 120 may terminate the session if the user 185 no longer has access to the account.

Figure 3:
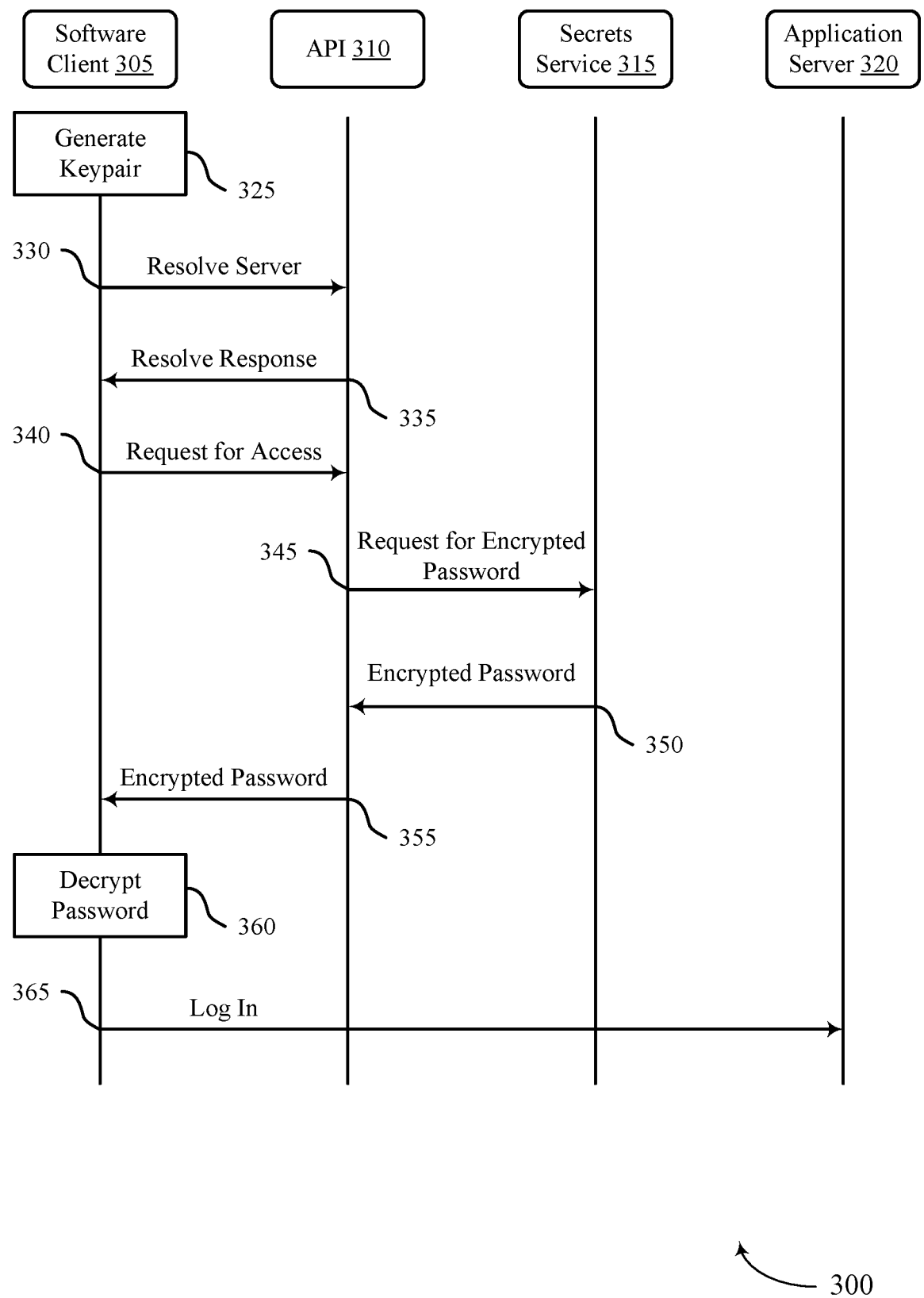
FIGS. 3 through 6 show examples of process flows that support establishing sessions via a proxy service in accordance with aspects of the present disclosure.

FIG. 3 shows an example of a process flow 300 that supports establishing sessions via a proxy service in accordance with aspects of the present disclosure. In some examples, the process flow 300 may implement aspects of the computing system 100, the computing system 200, or both. The process flow 300 may illustrate operations of a software client 305, an API 310, a secrets service 315, and an application server 320, which may examples of corresponding devices as described with reference to FIG. 1. For example, the API 310 may be an API of a cloud system, such as the cloud system 125 as described with reference to FIG. 1. Additionally, or alternatively, the secrets service 315 may be a service of an identity management system, such as the identity management system 120 as described with reference to FIGS. 1 and 2.

In the following description of the process flow 300, the operations performed at the software client 305, the API 310, the secrets service 315, and the application server 320 may be performed in different orders or at different times than shown. Additionally, or alternatively, some operations may be omitted from the process flow 300 and other operations may be added to the process flow 300.

In the example of FIG. 3, an identity management system may, via the secrets service 315, establish a session on behalf of a user. For example, the secrets service 315 may store a password for an account of the application server 320 and encrypt the password to be provided to the user such that the plaintext password may not be revealed (e.g., to the user or exchanged between the identity management system and an end-client, such as the software client 305 in the example of FIG. 3).

At 325, the software client 305 may generate a keypair. For example, the keypair may be an example of an asymmetric keypair that includes a public key and a private key.

At 330, the software client 305 may resolve the server with the API 310. For example, the software client 305 (e.g., and the API 310) may implement a name resolution system (e.g., a custom name resolution system), which may be used to resolve user-supplied names to a server registered with the software client 305 (e.g., or the API 310).

At 335, the API 310 may send a resolve response to the software client 305. In some examples, the resolve response may include an identifier of a server, a user access method, or both. For example, the software client 305 may use the user access method to access the application server 320. Additionally, or alternatively, the user access method may indicate that a password for an account is available.

At 340, the software client 305 may send a request for access to a user account to the API 310. For example, the user account may be of the application server 320. The request may be sent according to the user access method received at 335. In some examples, the request may include the public key of the keypair generated at 325.

At 345, the API 310 may send a request for an encrypted password to the secrets service 315. For example, the API 310 may request that a password for the account be encrypted according to the public key received from the software client 305 via the request at 340.

At 350, the secrets service 315 may send an encrypted password to the API 310. For example, the secrets service 315 may send the encrypted password to the API 310 as an encrypted token (e.g., a JSON web encryption (JWE)).

At 355, the API 310 may send the encrypted password to the software client 305. For example, the API 310 may forward the encrypted token received from the secrets service 315 at 350 to the software client 305. Additionally, or alternatively, the API 310 may send a message to the software client 305 that includes the encrypted password and also includes information associated with a connection between the software client 305 and the application server 320. For example, the information may include a credential indicating how the software client 305 is to connect to the application server 320.

At 360, the software client 305 may decrypt the password. For example, the software client 305 may obtain the password by decrypting the encrypted password received at 355. In some examples, the software client 305 may decrypt the password using the private key of the keypair.

At 365, the software client 305 may log in to the application server 320 using the password. For example, the software client 305 may log in to the account of the application server 320 using the decrypted password. The software client 305 may establish a session on behalf of the user with the application server 320 after logging into the account.

Figure 4:
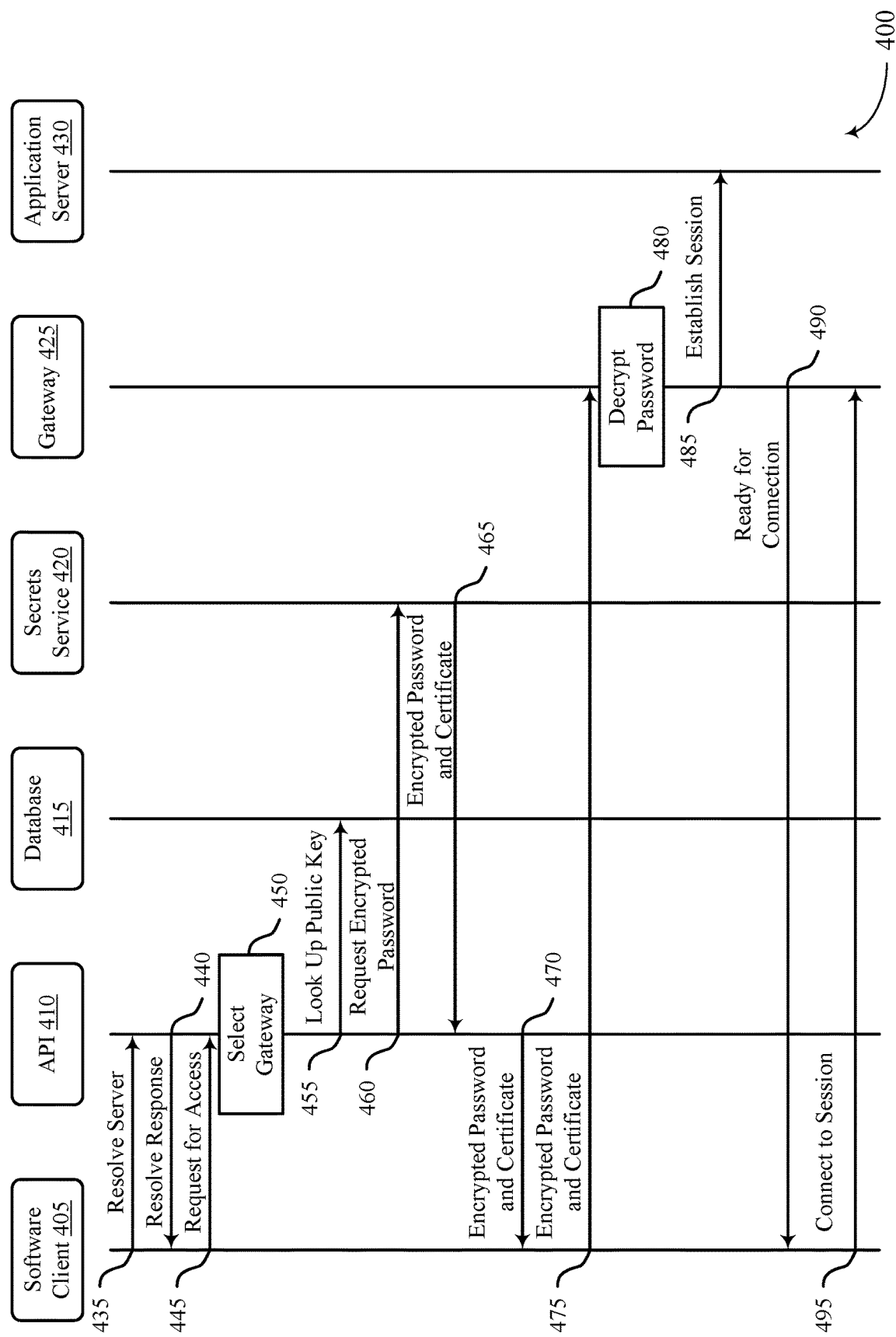

FIG. 4 shows an example of a process flow 400 that supports establishing sessions via a proxy service in accordance with aspects of the present disclosure. In some examples, the process flow 400 may implement aspects of the computing system 100, the computing system 200, or both. The process flow 400 may illustrate operations of a software client 405, an API 410, a database 415, a secrets service 420, a gateway 425, and an application server 430, which may examples of corresponding devices as described with reference to FIG. 1. For example, the API 410 may be an API of a cloud system, such as the cloud system 125 as described with reference to FIG. 1. Additionally, or alternatively, the secrets service 420 and/or the gateway 425 may be services of an identity management system, such as the identity management system 120 as described with reference to FIGS. 1 and 2.

In the following description of the process flow 400, the operations performed at the software client 405, the API 410, the database 415, the secrets service 420, the gateway 425, and the application server 430 may be performed in different orders or at different times than shown. Additionally, or alternatively, some operations may be omitted from the process flow 400 and other operations may be added to the process flow 400.

In the example of FIG. 4, an identity management system may, via the secrets service 420, establish a session on behalf of a user. For example, the secrets service 420 may store a password for an account of the application server 430 and encrypt the password to be provided to the user such that the plaintext password may not be revealed (e.g., to the user or exchanged between the identity management system and an end-client, such as the gateway 425 in the example of FIG. 4).

At 435, the software client 405 may resolve the server with the API 410. For example, the software client 405 or the API 410, or both, may implement a name resolution system as describe with reference to FIG. 3.

At 440, the API 410 may send a resolve response to the software client 405. In some examples, the resolve response may include an identifier of a server, a user access method, or both. For example, the software client 405 may use the user access method to access the application server 430. Additionally, or alternatively, the user access method may indicate that a password for an account is available.

At 445, the software client 405 may send a request for access to a user account to the API 410. For example, the user account may be of the application server 430. The request may be sent according to the user access method received at 440. In some examples, the request may be a request for a credential to access the application server 430. For example, the request may include the identifier of the server received at 440.

At 450, the API 410 may select a gateway. For example, the API 410 may detect that the software client 405 may establish a session with the application server 430 via a gateway (e.g., be constrained to use a gateway). Accordingly, the API 410 may select a gateway, such as the gateway 425. In some examples, the API 410 may detect that the session is to be established via a gateway and/or select the gateway 425 based on the request indicating the application server 430 (e.g., the identifier of the server).

At 455, the API 410 may look up a public key. For example, the API 410 may look up the public key at the database 415. In some examples, the database 415 may be associated with the secrets service 420 and/or the gateway 425. For example, the database 415 may be a database of an identity management system.

At 460, the API 410 may request an encrypted password from the secrets service 420. For example, the API 410 may request that a password for the account be encrypted according to the public key retrieved from the database 415 at 455.

At 465, the secrets service 420 may send the encrypted password to the API 410. For example, the secrets service 420 may send the encrypted password to the API 410 as an encrypted token (e.g., a JWE). Additionally, or alternatively, the secrets service 420 may send a certificate associated with a user of the software client 405. For example, the secrets service 420 may send the certificate such that the encrypted password may not be used to establish a session with a user other than the user of the software client 405. In some examples, the certificate may be associated with a time duration over which the certificate may be used to establish a session via the gateway 425. In other words, the certificate may have an expiration.

At 470, the API 410 may send the encrypted password and certificate to the software client 405. For example, the API 410 may forward the encrypted token received from the secrets service 420 at 465 to the software client 405. Additionally, or alternatively, a message including the encrypted password may also indicate information associated with a connection between the software client 405 and the application server 430. For example, the information may include a credential indicating how the software client 405 is to connect to the application server 430. In the example of FIG. 3, the information may indicate that the software client 405 is to establish a session with the application server 430 via the gateway 425. Additionally, or alternatively, the information may include an ephemeral credential for how to connect to the application server 430, an indication of a bastion server via which the software client 405 may connect to the application server 430, or both.

At 475, the software client 405 may send the encrypted password and certificate to the gateway 425. Additionally, or alternatively, the software client 405 may indicate the information associated with the connection between the software client 405 and the application server 430, including a connection type.

At 480, the gateway 425 may decrypt the password. For example, the gateway 425 may decrypt the password via a parent process. That is, the gateway 425 may forward the encrypted password to a service having access to the private key of the keypair, where the service may decrypt and return the password to the gateway 425. In some examples, the gateway 425 may generate the keypair during a setup process. For example, the gateway 425 may generate (e.g., as a 2048-bit Rivest-Shamir-Adleman (RSA) keypair) and store the keypair (e.g., as a JSON web key (JWK)) after an initial setup. Additionally, or alternatively, the gateway 425 may register the key with a platform. For example, the gateway 425 may retrieve or request use of the keypair via the platform.

At 485, the gateway 425 may establish a session with the application server 430. For example, the gateway 425 may establish the session based on decrypting the password at 480. In some examples, the gateway 425 may establish the session as the user of the software client 405. In other words, the gateway 425 may establish the session on behalf of the user of the software client 405.

At 490, the gateway 425 may indicate that the session is ready for connection to the software client 405. After receiving the indication, the software client 405 may connect to the session with the application server 430 via the gateway 425 at 495.

Figure 5:
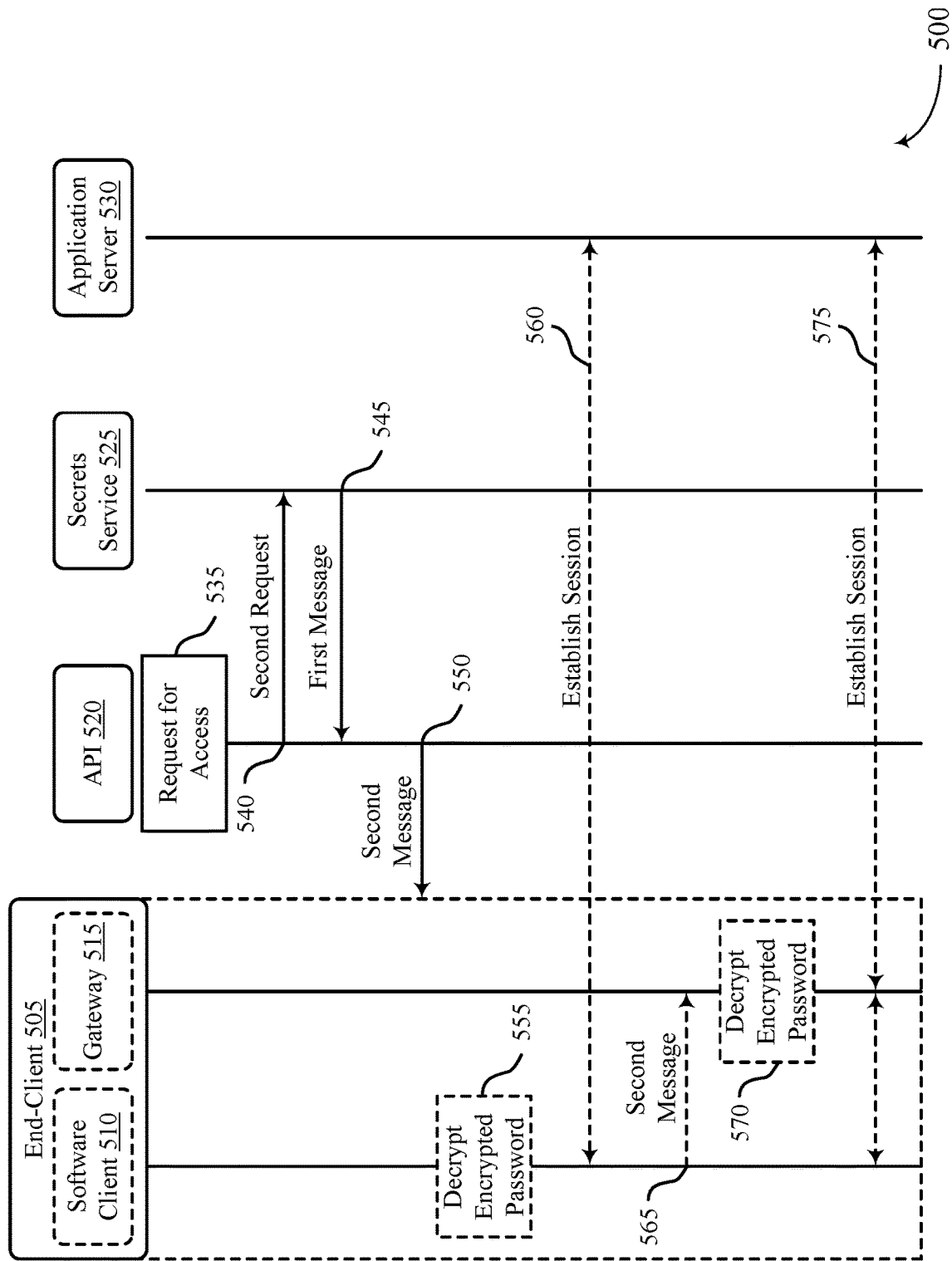

FIG. 5 shows an example of a process flow 500 that supports establishing sessions via a proxy service in accordance with aspects of the present disclosure. In some examples, the process flow 500 may implement aspects of the computing system 100, the computing system 200, or both. The process flow 500 may illustrate operations of an end-client 505 including a software client 510 and a gateway 515, an API 520, a secrets service 525, and an application server 530 which may examples of corresponding devices as described with reference to FIG. 1. For example, the API 520 may be an API of a cloud system, such as the cloud system 125 as described with reference to FIG. 1. Additionally, or alternatively, the secrets service 525 and/or the gateway 515 may be services of an identity management system, such as the identity management system 120 as described with reference to FIGS. 1 and 2.

In the following description of the process flow 500, the operations performed at the end-client 505 including the software client 510 and the gateway 515, the API 520, the secrets service 525, and the application server 530 may be performed in different orders or at different times than shown. Additionally, or alternatively, some operations may be omitted from the process flow 500 and other operations may be added to the process flow 500.

In the example of FIG. 5, an identity management system may, using the secrets service 525, establish a session on behalf of a user. For example, the user may connect to the session via the software client 510 or via the gateway 515.

At 535, the API 520 may receive a first request for user access to an account of the application server 530, where the first request is associated with a first user of the account. In some examples, the first request may include an indication of a public key. The API 520 may be a cloud service of the identity management system. For example, the API 520 may be an API of the cloud system 125 of the identity management system 120 as described with reference to FIG. 1.

In some examples, if the end-client 505 is the software client 510, the indication of the public key may be the public key itself. That is, if the software client 510 is the end-client 505, the software client 510 may have access to both the public key and the private key of the keypair and may indicate the public key directly to the API 520. In some other examples, if the end-client 505 is the gateway 515, the indication of the public key may be used by the API 520 to look up the public key. That is, if the end-client 505 is the gateway 515, the software client 510 may not have access to the public key and the private key of the keypair. Accordingly, the API 520 may access a database associated with the gateway 515 to retrieve the public key based on the indication.

At 540, the API 520 may transmit a second request to the secrets service 525. For example, the second request may be to encrypt a password associated with the first user to the public key of a keypair. That is, the API 520 may transmit the second request based on receiving the first request at 535 including the indication of the public key.

At 545, the secrets service 525 may transmit a first message to the API 520. For example, the first message may be in response to the second request at 540 and may include an encrypted password.

At 550, the API 520 may transmit a second message to the end-client 505. For example, the API 520 may transmit the second message including at least the encrypted password to the end-client 505. In some examples, the end-client may be the software client 510, and, in some other examples, the end-client may be the gateway 515. The end-client 505 may be associated with the identity management system and may have access to a private key of the keypair.

At 555, the software client 510 may decrypt the encrypted password. For example, if the software client 510 is the end-client 505, the software client 510 may decrypt the encrypted password using the private key after receiving the second message including the encrypted password at 550. The software client 510 may be on a device associated with the first user. For example, the software client 510 may be on a computing device 105 associated with the user 185 as described with reference to FIG. 1.

At 560, the software client 510 may establish a session for the account of the application server 530. For example, if the software client 510 is the end-client 505, the software client 510 may (e.g., directly) establish the session for the account of the application server 530 using the decrypted password.

At 565, the software client 510 may transmit the second message to the gateway 515. For example, the second message transmitted by the API 520 at 550 may include, in addition to the encrypted password, a certificate usable by the software client 510 for establishing a connection between the end-client 505 and the gateway 515 if, for example, the gateway 515 is the end-client 505. The software client 510 may forward the second message to the gateway 515 at 565, where the forwarded second message includes the encrypted password and the certificate.

In some examples, the second message may include the certificate based on determining, at the API 520, if the first user is one of multiple users having access to the application server 530. For example, the API 520 may refrain from providing the certificate to the software client 510 if the first user is not one of multiple users having access to the application server 530.

At 570, the gateway 515 may decrypt the encrypted password. For example, if the gateway 515 is the end-client, the gateway 515 may decrypt the encrypted password using the private key of the keypair on behalf of the first user.

At 575, the gateway 515 may establish a session on behalf of the first user. For example, the first user may connect to the session after the gateway 515 establishes a connection with the software client 510 based on the certificate. In other words, the gateway 515 may establish the session (e.g., as a proxy, indirectly) and connect the first user to the session based on the certificate in the second message received at 565.

In some examples, the end-client 505 may determine that the first user is one of the multiple users having access to the application server 530 at a first time. For example, the end-client 505 may establish the session with the account of the application server 530 at either 560 or 575 based on the user having access to the application server 530 at the first time.

Additionally, or alternatively, the end-client 505 may determine, at a second time after establishing the session at either 560 or 575, that the first user is not one of multiple users having access to the application server 530 at the second time. For example, the multiple users having access to the application server 530 may change. The end-client 505 may terminate the session based on the first user not having access to the application server 530 at the second time.

In some examples, the API 520 may check, after receiving the request at 535 or on a periodic basis after the session is established at 560 or at 575, a policy associated with the application server 530. For example, the API 520 may check whether a quantity of users accessing the account is below or at a threshold quantity of users indicated by the policy, a duration of a session indicated by the policy, or the like. The API 520 may initiate termination of the session based on checking the policy.

Figure 6:
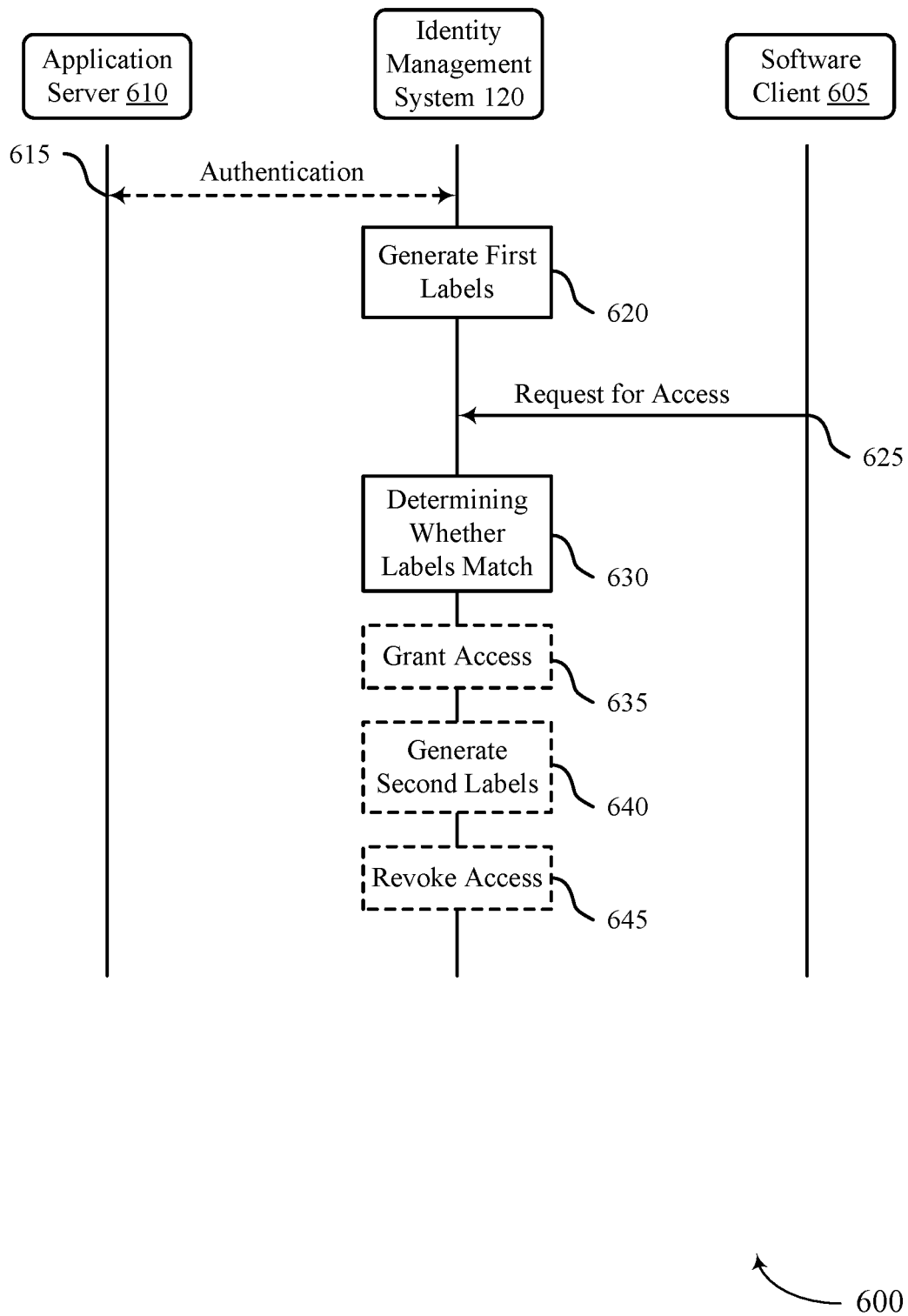

FIG. 6 shows an example of a process flow 600 that supports establishing sessions via a proxy service in accordance with aspects of the present disclosure. In some examples, the process flow 600 may implement aspects of the computing system 100, the computing system 200, or both. The process flow 600 may illustrate operations of an application server 610, an identity management system 120, and a software client 605, which may be examples of corresponding devices as described with reference to FIG. 1.

In the following description of the process flow 600, the operations performed at the application server 610 and the identity management system 120 may be performed in different orders or at different times than shown. Additionally, or alternatively, some operations may be omitted from the process flow 600 and other operations may be added to the process flow 600.

In the example of FIG. 6, the identity management system 120 may grant access to the application server 610 based on labels. For example, the identity management system 120 may compare labels of the application server 610 to labels of a user requesting to access an account of the application server 610 to determine whether to grant access.

At 615, the identity management system 120 may authenticate the application server 610.

At 620, the identity management system 120 may generate first labels. For example, the identity management system 120 may generate first labels associated with the application server 610. In other words, the identity management system 120 may automatically generate the first labels for the application server 610. In some examples, the identity management system 120 may generate the first labels based on authenticating the application server 610 at 615. In some other examples, the identity management system 120 may generate the first labels as part of an enrollment process for the application server 610.

At 625, the identity management system 120 may receive a request for access to the account of the application server 610. For example, the identity management system 120 may receive an access request via an API, which may be an example of an API illustrated by and described with reference to FIGS. 1 through 5. In some examples, the request may be associated with a first user of the account. Additionally, or alternatively, the first user may be associated with multiple labels.

At 630, the identity management system 120 may determine whether the labels match. For example, the identity management system 120 may determine whether the multiple labels associated with the first user include the first labels associated with the application server 610. The identity management system 120 may grant access or refrain from granting access based on the determining.

For example, at 635, the identity management system 120 may grant the first user access to the account of the application server 610. That is, the identity management system 120 may determine that the multiple labels include the first labels associated with the application server 610 and grant the first user access at a first time.

At 640, the identity management system 120 may generate second labels. For example, the identity management system 120 may generate the second labels associated with the application server 610 at a second time. In some examples, the identity management system 120 may generate the second labels based on the application server 610 re-authenticating with the identity management system 120.

At 645, the identity management system 120 may revoke access by the first user to the account of the application server 610. For example, the identity management system 120 may determine that the multiple labels associated with the user do not include the second labels. In some examples, the identity management system 120 may periodically evaluate whether the first user has access to the account. For example, the identity management system 120 may periodically check for access based on labels of the application server 610, of the first user, or both changing.

The first labels, the second labels, or both may include an operating system of the application server 610, an identifier of a cloud account associated with the application server 610, a hostname associated with the application server 610, a cloud provider of the application server 610, or the like.

Figure 7:
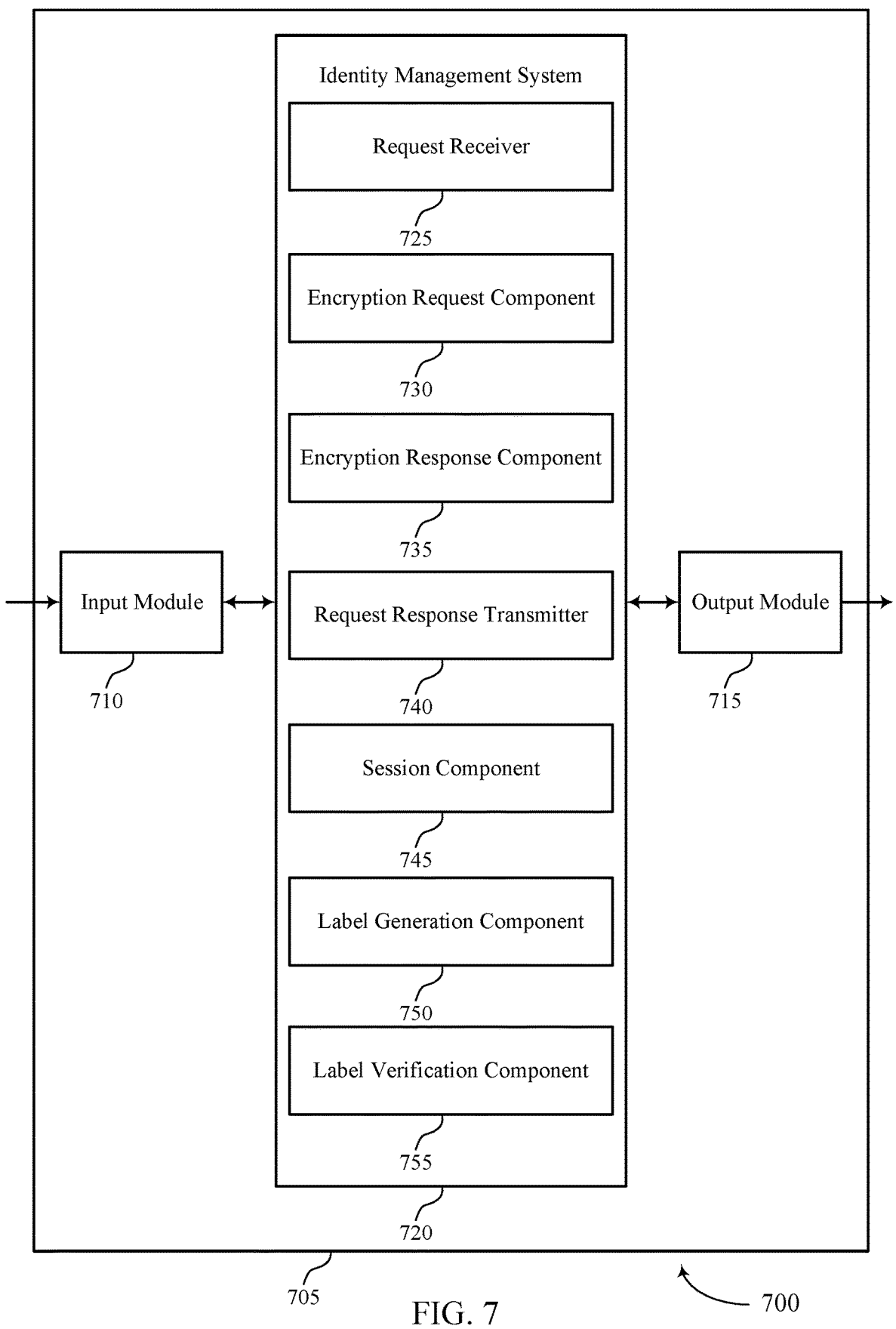
FIG. 7 shows a block diagram of an apparatus that supports establishing sessions via a proxy service in accordance with aspects of the present disclosure.

FIG. 7 shows a block diagram 700 of a device 705 that supports establishing sessions via a proxy service in accordance with aspects of the present disclosure. The device 705 may include an input module 710, an output module 715, and an identity management system 720. The device 705, or one or more components of the device 705 (e.g., the input module 710, the output module 715, and the identity management system 720), may include at least one processor, which may be coupled with at least one memory, to support the described techniques. Each of these components may be in communication with one another (e.g., via one or more buses).

The input module 710 may manage input signals for the device 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the device 705 for processing. For example, the input module 710 may transmit input signals to the identity management system 720 to support establishing sessions via a proxy service. In some cases, the input module 710 may be a component of an input/output (I/O) controller 910 as described with reference to FIG. 9.

The output module 715 may manage output signals for the device 705. For example, the output module 715 may receive signals from other components of the device 705, such as the identity management system 720, and may transmit these signals to other components or devices. In some examples, the output module 715 may transmit output signals for display in a user interface, for storage in a database or data store, for further processing at a server or server cluster, or for any other processes at any number of devices or systems. In some cases, the output module 715 may be a component of an I/O controller 910 as described with reference to FIG. 9.

For example, the identity management system 720 may include a request receiver 725, an encryption request component 730, an encryption response component 735, a request response transmitter 740, a session component 745, a label generation component 750, a label verification component 755, or any combination thereof. In some examples, the identity management system 720, or various components thereof, may be configured to perform various operations (e.g., receiving, monitoring, transmitting) using or otherwise in cooperation with the input module 710, the output module 715, or both. For example, the identity management system 720 may receive information from the input module 710, send information to the output module 715, or be integrated in combination with the input module 710, the output module 715, or both to receive information, transmit information, or perform various other operations as described herein.

The identity management system 720 may support managing sessions with an application server via an identity management system in accordance with examples as disclosed herein. The request receiver 725 may be configured to support receiving, via an API of a cloud service of the identity management system, a first request for user access to an account of the application server, where the first request is associated with a first user of the account. The encryption request component 730 may be configured to support transmitting, via the access point (API) and in response to the first request, a second request for a secrets service associated with the identity management system to encrypt a password associated with the first user to a public key of a keypair, where the first request includes an indication of the public key. The encryption response component 735 may be configured to support receiving, via the API and in response to the second request, a first message including the encrypted password, where the first message is received from the secrets service. The request response transmitter 740 may be configured to support transmitting, via the API in response to the first message, a second message including at least the encrypted password, where the second message is transmitted to an end-client that is associated with the identity management system and that has access to a private key of the keypair. The session component 745 may be configured to support establishing, at the end-client on behalf of the first user, a session for the account of the application server, where establishing the session is based on the end-client having access to the private key.

Additionally, or alternatively, the identity management system 720 may support managing sessions with an application server via an identity management system in accordance with examples as disclosed herein. The label generation component 750 may be configured to support generating one or more first labels associated with the application server. The request receiver 725 may be configured to support receiving, via an API of a cloud service of the identity management system, a first request for access to an account of the application server, where the first request is associated with a first user of the account, and where the first user is associated with a set of multiple labels. The label verification component 755 may be configured to support determining whether the set of multiple labels includes the one or more first labels associated with the application server, where granting the first user access to the account of the application server is based on the determining.

Figure 8:
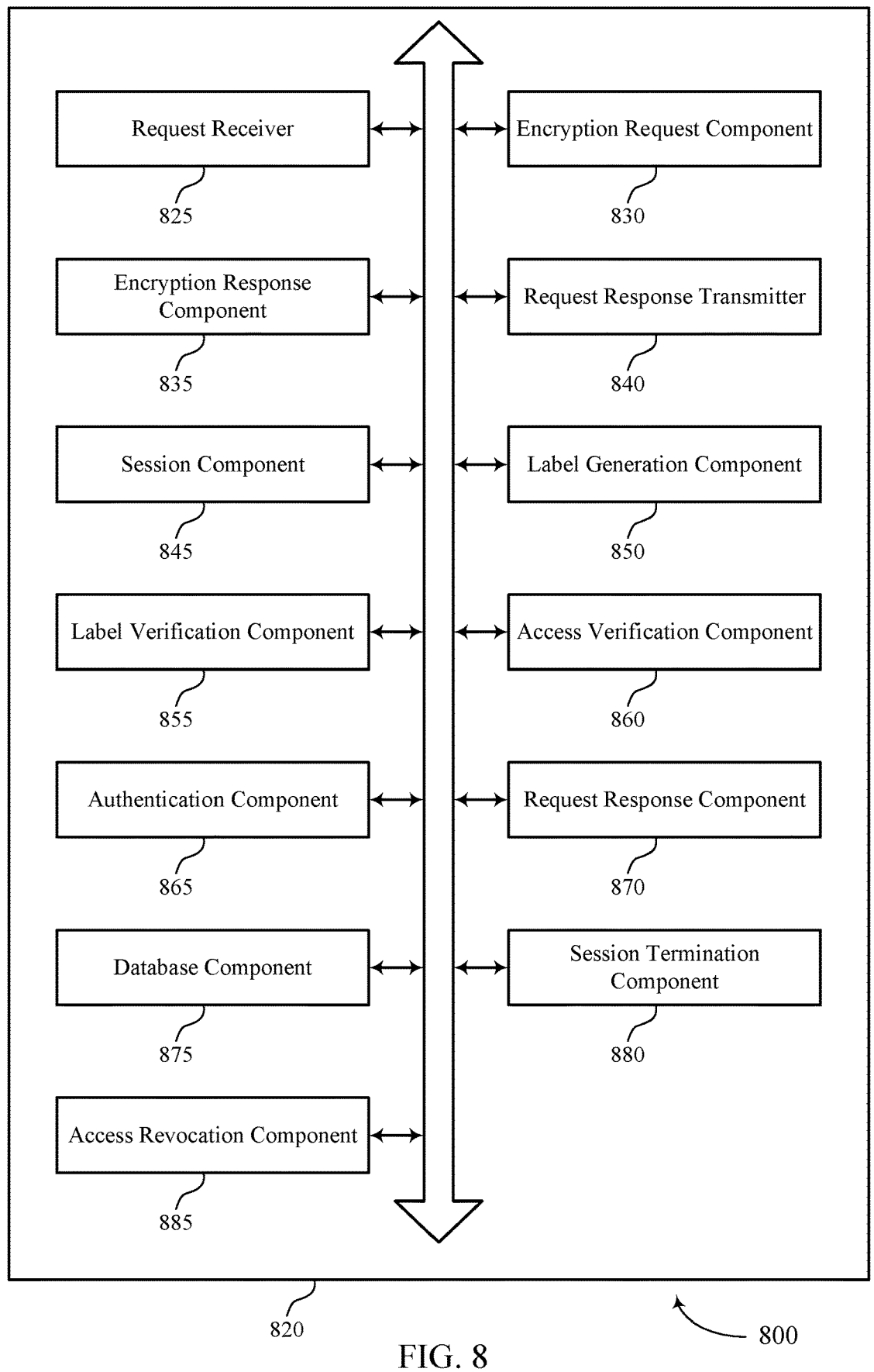
FIG. 8 shows a block diagram of an identity management system that supports establishing sessions via a proxy service in accordance with aspects of the present disclosure.

FIG. 8 shows a block diagram 800 of an identity management system 820 that supports establishing sessions via a proxy service in accordance with aspects of the present disclosure. The identity management system 820 may be an example of aspects of an identity management system or an identity management system 720, or both, as described herein. The identity management system 820, or various components thereof, may be an example of means for performing various aspects of establishing sessions via a proxy service as described herein. For example, the identity management system 820 may include a request receiver 825, an encryption request component 830, an encryption response component 835, a request response transmitter 840, a session component 845, a label generation component 850, a label verification component 855, an access verification component 860, an authentication component 865, a request response component 870, a database component 875, a session termination component 880, an access revocation component 885, or any combination thereof. Each of these components, or components of subcomponents thereof (e.g., one or more processors, one or more memories), may communicate, directly or indirectly, with one another (e.g., via one or more buses).

The identity management system 820 may support managing sessions with an application server via an identity management system in accordance with examples as disclosed herein. The request receiver 825 may be configured to support receiving, via an API of a cloud service of the identity management system, a first request for user access to an account of the application server, where the first request is associated with a first user of the account. The encryption request component 830 may be configured to support transmitting, via the API and in response to the first request, a second request for a secrets service associated with the identity management system to encrypt a password associated with the first user to a public key of a keypair, where the first request includes an indication of the public key. The encryption response component 835 may be configured to support receiving, via the API and in response to the second request, a first message including the encrypted password, where the first message is received from the secrets service. The request response transmitter 840 may be configured to support transmitting, via the API in response to the first message, a second message including at least the encrypted password, where the second message is transmitted to an end-client that is associated with the identity management system and that has access to a private key of the keypair. The session component 845 may be configured to support establishing, at the end-client on behalf of the first user, a session for the account of the application server, where establishing the session is based on the end-client having access to the private key.

In some examples, the end-client includes a software client on a device associated with the first user.

In some examples, the first request is associated with the first user of the account and includes the public key of the keypair, and where the session is established between the end-client and the application server based on the first request including the public key.

In some examples, the session component 845 may be configured to support decrypting, via the private key of the keypair and at the software client, the encrypted password, where establishing the session is based on decrypting the encrypted password.

In some examples, the end-client includes a gateway associated with the identity management system.

In some examples, to support transmitting the second message, the request response transmitter 840 may be configured to support transmitting the second message to a software client on a device associated with the first user, where the second message further includes a certificate usable by the software client for establishing a connection between the software client and the end-client. In some examples, to support transmitting the second message, the request response transmitter 840 may be configured to support receiving, at the gateway and from the device, the second message including the encrypted password and the certificate. In some examples, to support transmitting the second message, the session component 845 may be configured to support establishing the connection with the software client based on the certificate, where establishing the session on behalf of the first user is based on establishing the connection with the software client.

In some examples, the session component 845 may be configured to support decrypting, at the gateway and using the private key of the keypair, the encrypted password on behalf of the first user, where establishing the session on behalf of the first user is based on decrypting the encrypted password.

In some examples, to support transmitting the second message, the access verification component 860 may be configured to support determining, via the API, that the first user is one of the set of multiple users having access to the application server, where the second message includes the certificate based on the determining.

In some examples, the database component 875 may be configured to support accessing a database associated with the gateway to retrieve the public key of the keypair, where transmitting the first message is based on accessing the database.

In some examples, the access verification component 860 may be configured to support determining, via the end-client, that the first user is one of a first set of multiple users having access to the application server at a first time, where establishing the session is based on the first user having access to the application server at the first time.

In some examples, the access verification component 860 may be configured to support determining, at a second time after establishing the session, that the first user is not one of a second set of multiple users having access to the application server at the second time. In some examples, the session termination component 880 may be configured to support terminating the session based on the first user not having access to the application server at the second time.

Additionally, or alternatively, the identity management system 820 may support managing sessions with an application server via an identity management system in accordance with examples as disclosed herein. The label generation component 850 may be configured to support generating one or more first labels associated with the application server. In some examples, the request receiver 825 may be configured to support receiving, via an API of a cloud service of the identity management system, a first request for access to an account of the application server, where the first request is associated with a first user of the account, and where the first user is associated with a set of multiple labels. The label verification component 855 may be configured to support determining whether the set of multiple labels includes the one or more first labels associated with the application server, where granting the first user access to the account of the application server is based on the determining.

In some examples, to support generating the one or more first labels, the label generation component 850 may be configured to support generating the one or more first labels as part of an enrollment process for the application server.

In some examples, to support generating the one or more first labels, the authentication component 865 may be configured to support authenticating the application server via the identity management system, where generating the one or more first labels is based on the authenticating.

In some examples, the label verification component 855 may be configured to support determining that the set of multiple labels includes the one or more first labels associated with the application server. In some examples, the request response component 870 may be configured to support granting, at a first time in response to the first request, the first user access to the account of the application server based on the set of multiple labels including the one or more first labels.

In some examples, the label generation component 850 may be configured to support generating, at a second time after the first time, one or more second labels associated with the application server. In some examples, the label verification component 855 may be configured to support determining that the set of multiple labels does not include the one or more second labels associated with the application server. In some examples, the access revocation component 885 may be configured to support revoking access by the first user to the account of the application server based on the set of multiple labels not including the one or more second labels.

In some examples, the one or more first labels include an operating system of the application server, an identifier of a cloud account associated with the application server, a hostname associated with the application server, a cloud provider of the application server, or any combination thereof.

Figure 9:
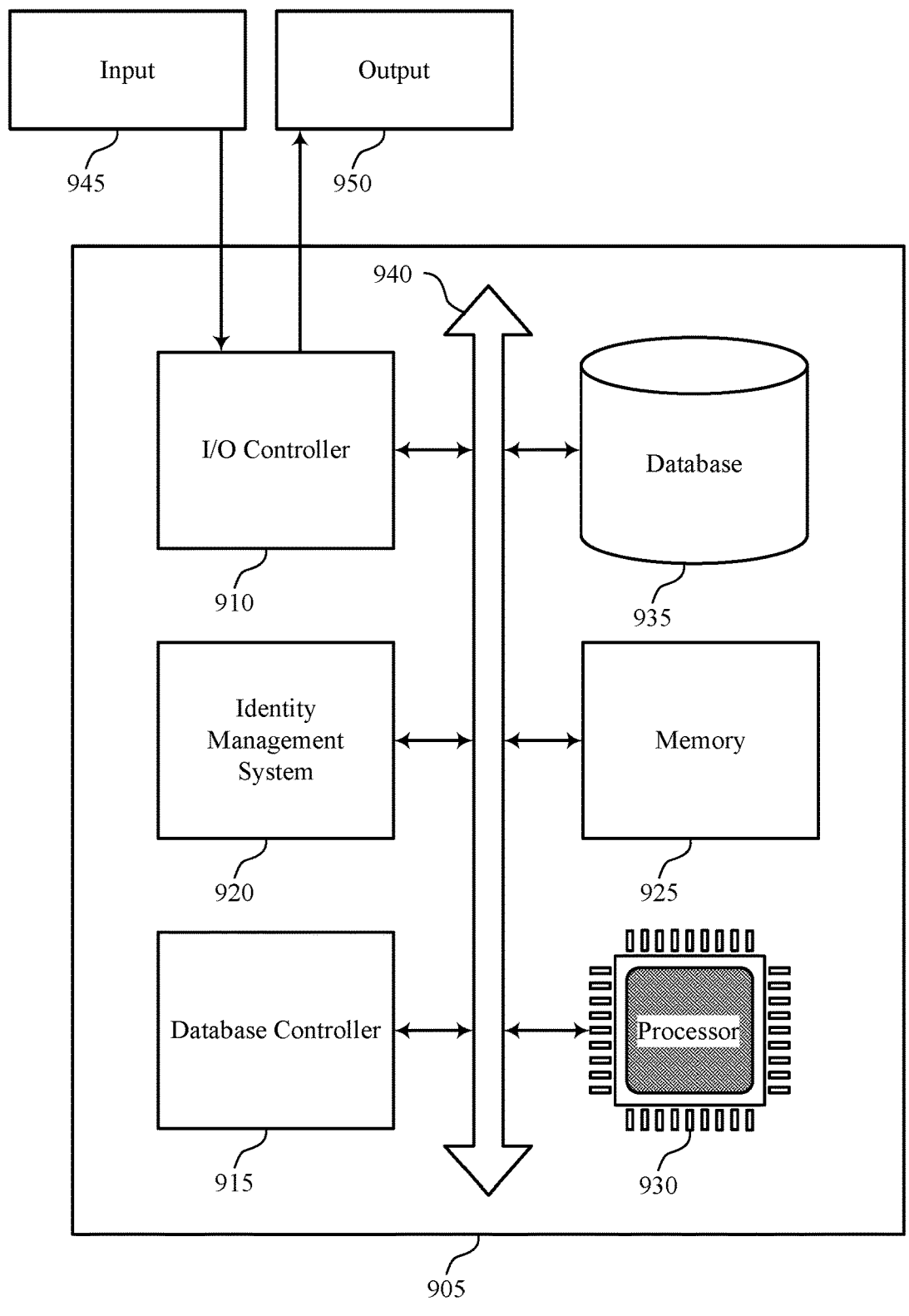
FIG. 9 shows a diagram of a system including a device that supports establishing sessions via a proxy service in accordance with aspects of the present disclosure.

FIG. 9 shows a diagram of a system 900 including a device 905 that supports establishing sessions via a proxy service in accordance with aspects of the present disclosure. The device 905 may be an example of or include the components of a device 705 as described herein. The device 905 may include components for establishing sessions via a proxy service, such as an identity management system 920, an I/O controller 910, a database controller 915, at least one memory 925, at least one processor 930, and a database 935. These components may be in electronic communication or otherwise coupled (e.g., operatively, communicatively, functionally, electronically, electrically) via one or more buses (e.g., a bus 940).

The I/O controller 910 may manage input signals 945 and output signals 950 for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. In other cases, the I/O controller 910 may represent or interact with a modem, a keyboard, a mouse, a touchscreen, or a similar device. In some cases, the I/O controller 910 may be implemented as part of a processor 930. In some examples, a user may interact with the device 905 via the I/O controller 910 or via hardware components controlled by the I/O controller 910.

The database controller 915 may manage data storage and processing in a database 935. In some cases, a user may interact with the database controller 915. In other cases, the database controller 915 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause at least one processor 930 to perform various functions described herein. In some cases, the memory 925 may contain, among other things, a basic I/O system (BIOS) which may control basic hardware or software operation such as the interaction with peripheral components or devices. The memory 925 may be an example of a single memory or multiple memories. For example, the device 905 may include one or more memories 925.

The processor 930 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in at least one memory 925 to perform various functions (e.g., functions or tasks supporting establishing sessions via a proxy service). The processor 930 may be an example of a single processor or multiple processors. For example, the device 905 may include one or more processors 930.

The identity management system 920 may support managing sessions with an application server via an identity management system in accordance with examples as disclosed herein. For example, the identity management system 920 may be configured to support receiving, via an API of a cloud service of the identity management system, a first request for user access to an account of the application server, where the first request is associated with a first user of the account. The identity management system 920 may be configured to support transmitting, via the API and in response to the first request, a second request for a secrets service associated with the identity management system to encrypt a password associated with the first user to a public key of a keypair, where the first request includes an indication of the public key. The identity management system 920 may be configured to support receiving, via the API and in response to the second request, a first message including the encrypted password, where the first message is received from the secrets service. The identity management system 920 may be configured to support transmitting, via the API in response to the first message, a second message including at least the encrypted password, where the second message is transmitted to an end-client that is associated with the identity management system and that has access to a private key of the keypair. The identity management system 920 may be configured to support establishing, at the end-client on behalf of the first user, a session for the account of the application server, where establishing the session is based on the end-client having access to the private key.

Additionally, or alternatively, the identity management system 920 may support managing sessions with an application server via an identity management system in accordance with examples as disclosed herein. For example, the identity management system 920 may be configured to support generating one or more first labels associated with the application server. The identity management system 920 may be configured to support receiving, via an API of a cloud service of the identity management system, a first request for access to an account of the application server, where the first request is associated with a first user of the account, and where the first user is associated with a set of multiple labels. The identity management system 920 may be configured to support determining whether the set of multiple labels includes the one or more first labels associated with the application server, where granting the first user access to the account of the application server is based on the determining.

By including or configuring the identity management system 920 in accordance with examples as described herein, the device 905 may support techniques for improved security.

Figure 10:
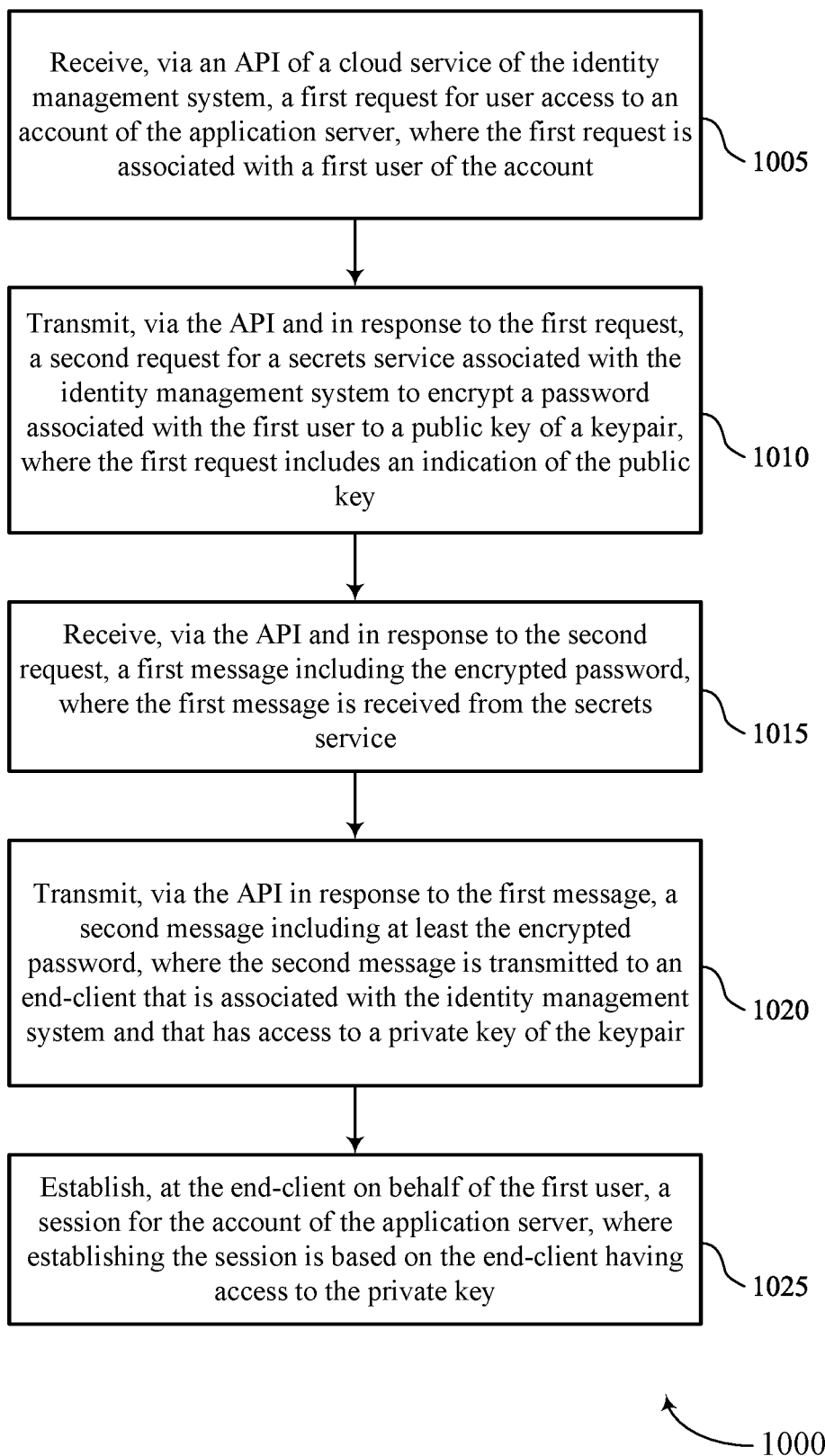
FIGS. 10 through 13 show flowcharts illustrating methods that support establishing sessions via a proxy service in accordance with aspects of the present disclosure.

FIG. 10 shows a flowchart illustrating a method 1000 that supports establishing sessions via a proxy service in accordance with aspects of the present disclosure. The operations of the method 1000 may be implemented by an identity management system or its components as described herein. For example, the operations of the method 1000 may be performed by an identity management system as described with reference to FIGS. 1 through 9. In some examples, an identity management system may execute a set of instructions to control the functional elements of the identity management system to perform the described functions. Additionally, or alternatively, the identity management system may perform aspects of the described functions using special-purpose hardware.

At 1005, the method may include receiving, via an API of a cloud service of the identity management system, a first request for user access to an account of the application server, where the first request is associated with a first user of the account. The operations of block 1005 may be performed in accordance with examples as disclosed herein. In some examples, aspects of the operations of 1005 may be performed by a request receiver 825 as described with reference to FIG. 8.

At 1010, the method may include transmitting, via the API and in response to the first request, a second request for a secrets service associated with the identity management system to encrypt a password associated with the first user to a public key of a keypair, where the first request includes an indication of the public key. The operations of block 1010 may be performed in accordance with examples as disclosed herein. In some examples, aspects of the operations of 1010 may be performed by an encryption request component 830 as described with reference to FIG. 8.

At 1015, the method may include receiving, via the API and in response to the second request, a first message including the encrypted password, where the first message is received from the secrets service. The operations of block 1015 may be performed in accordance with examples as disclosed herein. In some examples, aspects of the operations of 1015 may be performed by an encryption response component 835 as described with reference to FIG. 8.

At 1020, the method may include transmitting, via the API in response to the first message, a second message including at least the encrypted password, where the second message is transmitted to an end-client that is associated with the identity management system and that has access to a private key of the keypair. The operations of block 1020 may be performed in accordance with examples as disclosed herein. In some examples, aspects of the operations of 1020 may be performed by a request response transmitter 840 as described with reference to FIG. 8.

At 1025, the method may include establishing, at the end-client on behalf of the first user, a session for the account of the application server, where establishing the session is based on the end-client having access to the private key. The operations of block 1025 may be performed in accordance with examples as disclosed herein. In some examples, aspects of the operations of 1025 may be performed by a session component 845 as described with reference to FIG. 8.

Figure 11:
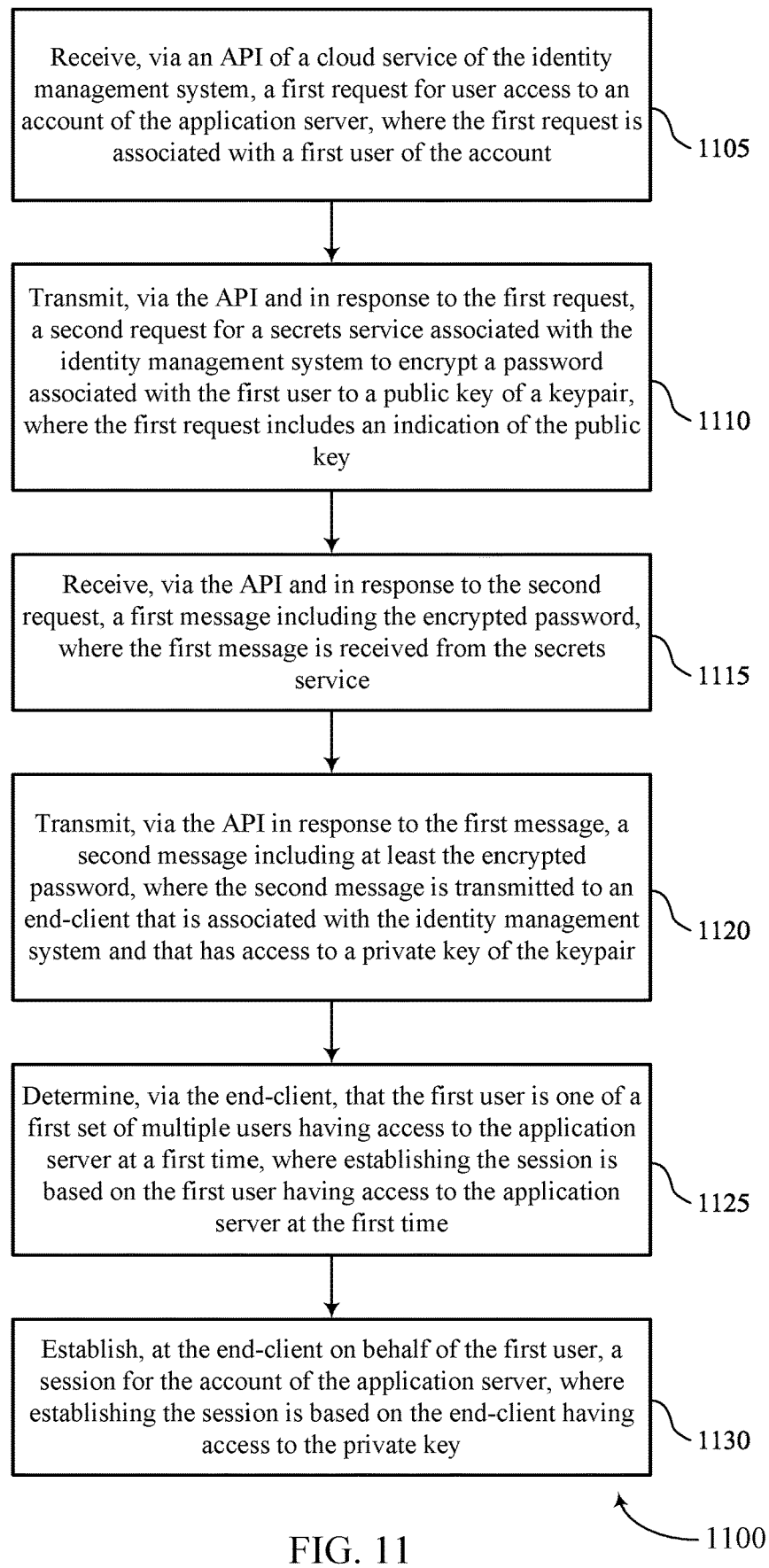

FIG. 11 shows a flowchart illustrating a method 1100 that supports establishing sessions via a proxy service in accordance with aspects of the present disclosure. The operations of the method 1100 may be implemented by an identity management system or its components as described herein. For example, the operations of the method 1100 may be performed by an identity management system as described with reference to FIGS. 1 through 9. In some examples, an identity management system may execute a set of instructions to control the functional elements of the identity management system to perform the described functions. Additionally, or alternatively, the identity management system may perform aspects of the described functions using special-purpose hardware.

At 1105, the method may include receiving, via an API of a cloud service of the identity management system, a first request for user access to an account of the application server, where the first request is associated with a first user of the account. The operations of block 1105 may be performed in accordance with examples as disclosed herein. In some examples, aspects of the operations of 1105 may be performed by a request receiver 825 as described with reference to FIG. 8.

At 1110, the method may include transmitting, via the API and in response to the first request, a second request for a secrets service associated with the identity management system to encrypt a password associated with the first user to a public key of a keypair, where the first request includes an indication of the public key. The operations of block 1110 may be performed in accordance with examples as disclosed herein. In some examples, aspects of the operations of 1110 may be performed by an encryption request component 830 as described with reference to FIG. 8.

At 1115, the method may include receiving, via the API and in response to the second request, a first message including the encrypted password, where the first message is received from the secrets service. The operations of block 1115 may be performed in accordance with examples as disclosed herein. In some examples, aspects of the operations of 1115 may be performed by an encryption response component 835 as described with reference to FIG. 8.

At 1120, the method may include transmitting, via the API in response to the first message, a second message including at least the encrypted password, where the second message is transmitted to an end-client that is associated with the identity management system and that has access to a private key of the keypair. The operations of block 1120 may be performed in accordance with examples as disclosed herein. In some examples, aspects of the operations of 1120 may be performed by a request response transmitter 840 as described with reference to FIG. 8.

At 1125, the method may include determining, via the end-client, that the first user is one of a first set of multiple users having access to the application server at a first time, where establishing the session is based on the first user having access to the application server at the first time. The operations of block 1125 may be performed in accordance with examples as disclosed herein. In some examples, aspects of the operations of 1125 may be performed by an access verification component 860 as described with reference to FIG. 8.

At 1130, the method may include establishing, at the end-client on behalf of the first user, a session for the account of the application server, where establishing the session is based on the end-client having access to the private key. The operations of block 1130 may be performed in accordance with examples as disclosed herein. In some examples, aspects of the operations of 1130 may be performed by a session component 845 as described with reference to FIG. 8.

Figure 12:
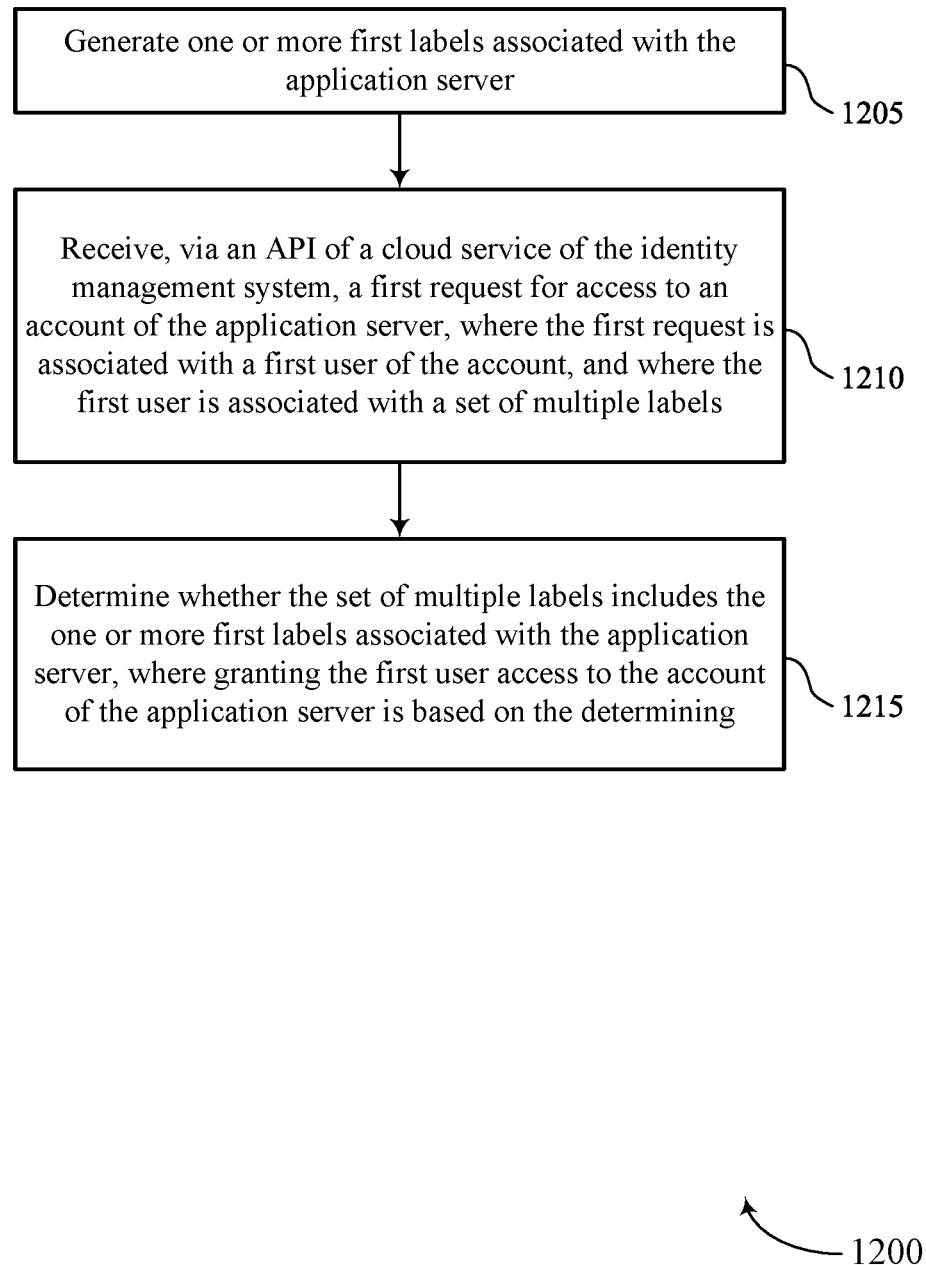

FIG. 12 shows a flowchart illustrating a method 1200 that supports establishing sessions via a proxy service in accordance with aspects of the present disclosure. The operations of the method 1200 may be implemented by an identity management system or its components as described herein. For example, the operations of the method 1200 may be performed by an identity management system as described with reference to FIGS. 1 through 9. In some examples, an identity management system may execute a set of instructions to control the functional elements of the identity management system to perform the described functions. Additionally, or alternatively, the identity management system may perform aspects of the described functions using special-purpose hardware.

At 1205, the method may include generating one or more first labels associated with the application server. The operations of block 1205 may be performed in accordance with examples as disclosed herein. In some examples, aspects of the operations of 1205 may be performed by a label generation component 850 as described with reference to FIG. 8.

At 1210, the method may include receiving, via an API of a cloud service of the identity management system, a first request for access to an account of the application server, where the first request is associated with a first user of the account, and where the first user is associated with a set of multiple labels. The operations of block 1210 may be performed in accordance with examples as disclosed herein. In some examples, aspects of the operations of 1210 may be performed by a request receiver 825 as described with reference to FIG. 8.

At 1215, the method may include determining whether the set of multiple labels includes the one or more first labels associated with the application server, where granting the first user access to the account of the application server is based on the determining. The operations of block 1215 may be performed in accordance with examples as disclosed herein. In some examples, aspects of the operations of 1215 may be performed by a label verification component 855 as described with reference to FIG. 8.

Figure 13:
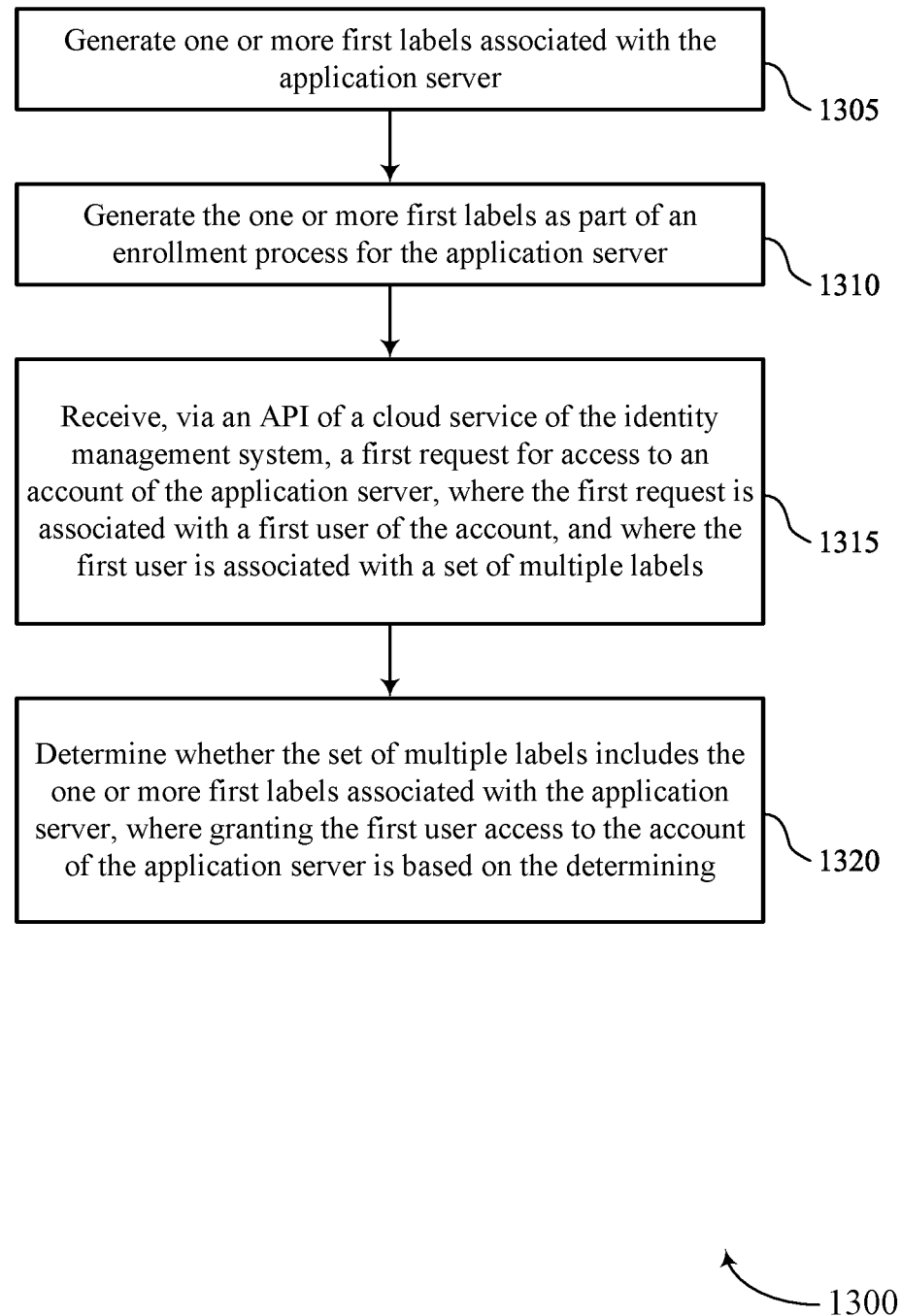

FIG. 13 shows a flowchart illustrating a method 1300 that supports establishing sessions via a proxy service in accordance with aspects of the present disclosure. The operations of the method 1300 may be implemented by an identity management system or its components as described herein. For example, the operations of the method 1300 may be performed by an identity management system as described with reference to FIGS. 1 through 9. In some examples, an identity management system may execute a set of instructions to control the functional elements of the identity management system to perform the described functions. Additionally, or alternatively, the identity management system may perform aspects of the described functions using special-purpose hardware.

At 1305, the method may include generating one or more first labels associated with the application server. The operations of block 1305 may be performed in accordance with examples as disclosed herein. In some examples, aspects of the operations of 1305 may be performed by a label generation component 850 as described with reference to FIG. 8.

At 1310, the method may include generating the one or more first labels as part of an enrollment process for the application server. The operations of block 1310 may be performed in accordance with examples as disclosed herein. In some examples, aspects of the operations of 1310 may be performed by a label generation component 850 as described with reference to FIG. 8.

At 1315, the method may include receiving, via an API of a cloud service of the identity management system, a first request for access to an account of the application server, where the first request is associated with a first user of the account, and where the first user is associated with a set of multiple labels. The operations of block 1315 may be performed in accordance with examples as disclosed herein. In some examples, aspects of the operations of 1315 may be performed by a request receiver 825 as described with reference to FIG. 8.

At 1320, the method may include determining whether the set of multiple labels includes the one or more first labels associated with the application server, where granting the first user access to the account of the application server is based on the determining. The operations of block 1320 may be performed in accordance with examples as disclosed herein. In some examples, aspects of the operations of 1320 may be performed by a label verification component 855 as described with reference to FIG. 8.

The following provides an overview of aspects of the present disclosure:

Aspect 1: A method for managing sessions with an application server via an identity management system, comprising: receiving, via an API of a cloud service of the identity management system, a first request for user access to an account of the application server, wherein the first request is associated with a first user of the account; transmitting, via the API and in response to the first request, a second request for a secrets service associated with the identity management system to encrypt a password associated with the first user to a public key of a keypair, wherein the first request includes an indication of the public key; receiving, via the API and in response to the second request, a first message comprising the encrypted password, wherein the first message is received from the secrets service; transmitting, via the API in response to the first message, a second message comprising at least the encrypted password, wherein the second message is transmitted to an end-client that is associated with the identity management system and that has access to a private key of the keypair; and establishing, at the end-client on behalf of the first user, a session for the account of the application server, wherein establishing the session is based at least in part on the end-client having access to the private key.

Aspect 2: The method of aspect 1, wherein the end-client comprises a software client on a device associated with the first user.

Aspect 3: The method of aspect 2, wherein the first request is associated with the first user of the account and includes the public key of the keypair, and wherein the session is established between the end-client and the application server based at least in part on the first request including the public key.

Aspect 4: The method of any of aspects 2 through 3, further comprising: decrypting, via the private key of the keypair and at the software client, the encrypted password, wherein establishing the session is based at least in part on decrypting the encrypted password.

Aspect 5: The method of any of aspects 1 through 4, wherein the end-client comprises a gateway associated with the identity management system.

Aspect 6: The method of aspect 5, wherein transmitting the second message comprises: transmitting the second message to a software client on a device associated with the first user, wherein the second message further comprises a certificate usable by the software client for establishing a connection between the software client and the end-client; receiving, at the gateway and from the device, the second message comprising the encrypted password and the certificate; and establishing the connection with the software client based at least in part on the certificate, wherein establishing the session on behalf of the first user is based at least in part on establishing the connection with the software client.

Aspect 7: The method of aspect 6, further comprising: decrypting, at the gateway and using the private key of the keypair, the encrypted password on behalf of the first user, wherein establishing the session on behalf of the first user is based at least in part on decrypting the encrypted password.

Aspect 8: The method of any of aspects 6 through 7, wherein the application server is associated with a plurality of users having access to the application server, and wherein transmitting the second message further comprises: determining, via the API, that the first user is one of the plurality of users having access to the application server, wherein the second message includes the certificate based at least in part on the determining.

Aspect 9: The method of any of aspects 5 through 8, further comprising: accessing a database associated with the gateway to retrieve the public key of the keypair, wherein transmitting the first message is based at least in part on accessing the database.

Aspect 10: The method of any of aspects 1 through 9, further comprising: determining, via the end-client, that the first user is one of a first plurality of users having access to the application server at a first time, wherein establishing the session is based at least in part on the first user having access to the application server at the first time.

Aspect 11: The method of aspect 10, further comprising: determining, at a second time after establishing the session, that the first user is not one of a second plurality of users having access to the application server at the second time; and terminating the session based at least in part on the first user not having access to the application server at the second time.

Aspect 12: A method for managing sessions with an application server via an identity management system, comprising: generating one or more first labels associated with the application server; receiving, via an API of a cloud service of the identity management system, a first request for access to an account of the application server, wherein the first request is associated with a first user of the account, and wherein the first user is associated with a plurality of labels; and determining whether the plurality of labels includes the one or more first labels associated with the application server, wherein granting the first user access to the account of the application server is based at least in part on the determining.

Aspect 13: The method of aspect 12, wherein generating the one or more first labels comprises: generating the one or more first labels as part of an enrollment process for the application server.

Aspect 14: The method of any of aspects 12 through 13, wherein generating the one or more first labels comprises: authenticating the application server via the identity management system, wherein generating the one or more first labels is based at least in part on the authenticating.

Aspect 15: The method of any of aspects 12 through 14, further comprising: determining that the plurality of labels includes the one or more first labels associated with the application server; and granting, at a first time in response to the first request, the first user access to the account of the application server based at least in part on the plurality of labels including the one or more first labels.

Aspect 16: The method of aspect 15, further comprising: generating, at a second time after the first time, one or more second labels associated with the application server; determining that the plurality of labels does not include the one or more second labels associated with the application server; and revoking access by the first user to the account of the application server based at least in part on the plurality of labels not including the one or more second labels.

Aspect 17: The method of any of aspects 12 through 16, wherein the one or more first labels comprise an operating system of the application server, an identifier of a cloud account associated with the application server, a hostname associated with the application server, a cloud provider of the application server, or any combination thereof.

Aspect 18: An apparatus for managing sessions with an application server via an identity management system, comprising one or more memories storing processor-executable code, and one or more processors coupled with the one or more memories and individually or collectively operable to execute the code to cause the apparatus to perform a method of any of aspects 1 through 11.

Aspect 19: An apparatus for managing sessions with an application server via an identity management system, comprising at least one means for performing a method of any of aspects 1 through 11.

Aspect 20: A non-transitory computer-readable medium storing code for managing sessions with an application server via an identity management system, the code comprising instructions executable by one or more processors to perform a method of any of aspects 1 through 11.

Aspect 21: An apparatus for managing sessions with an application server via an identity management system, comprising one or more memories storing processor-executable code, and one or more processors coupled with the one or more memories and individually or collectively operable to execute the code to cause the apparatus to perform a method of any of aspects 12 through 17.

Aspect 22: An apparatus for managing sessions with an application server via an identity management system, comprising at least one means for performing a method of any of aspects 12 through 17.

Aspect 23: A non-transitory computer-readable medium storing code for managing sessions with an application server via an identity management system, the code comprising instructions executable by one or more processors to perform a method of any of aspects 12 through 17. It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing sessions with an application server via an identity management system, comprising:
   receiving, via an application protocol interface (API) of a cloud service of the identity management system, a first request for user access to an account of the application server, wherein the first request is associated with a first user of the account;
   transmitting, via the API and in response to the first request, a second request for a secrets service associated with the identity management system to encrypt a password associated with the first user to a public key of a keypair, wherein the first request includes an indication of the public key;
   receiving, via the API and in response to the second request, a first message comprising the encrypted password, wherein the first message is received from the secrets service;
   transmitting, via the API in response to the first message, a second message comprising at least the encrypted password, wherein the second message is transmitted to an end-client that is associated with the identity management system and that has access to a private key of the keypair; and
   establishing, at the end-client on behalf of the first user, a session for the account of the application server, wherein establishing the session is based at least in part on the end-client having access to the private key.

2. The method of claim 1, wherein the end-client comprises a software client on a device associated with the first user.

3. The method of claim 2, wherein the first request is associated with the first user of the account and includes the public key of the keypair, and wherein the session is established between the end-client and the application server based at least in part on the first request including the public key.

4. The method of claim 2, further comprising:
   decrypting, via the private key of the keypair and at the software client, the encrypted password, wherein establishing the session is based at least in part on decrypting the encrypted password.

5. The method of claim 1, wherein the end-client comprises a gateway associated with the identity management system.

6. The method of claim 5, wherein transmitting the second message comprises:
   transmitting the second message to a software client on a device associated with the first user, wherein the second message further comprises a certificate usable by the software client for establishing a connection between the software client and the end-client;
   receiving, at the gateway and from the device, the second message comprising the encrypted password and the certificate; and
   establishing the connection with the software client based at least in part on the certificate, wherein establishing the session on behalf of the first user is based at least in part on establishing the connection with the software client.

7. The method of claim 6, further comprising:
   decrypting, at the gateway and using the private key of the keypair, the encrypted password on behalf of the first user, wherein establishing the session on behalf of the first user is based at least in part on decrypting the encrypted password.

8. The method of claim 6, wherein the application server is associated with a plurality of users having access to the application server, and wherein transmitting the second message further comprises:
   determining, via the API, that the first user is one of the plurality of users having access to the application server, wherein the second message includes the certificate based at least in part on the determining.

9. The method of claim 5, further comprising:
   accessing a database associated with the gateway to retrieve the public key of the keypair, wherein transmitting the first message is based at least in part on accessing the database.

10. The method of claim 1, further comprising:
    determining, via the end-client, that the first user is one of a first plurality of users having access to the application server at a first time, wherein establishing the session is based at least in part on the first user having access to the application server at the first time.

11. The method of claim 10, further comprising:
    determining, at a second time after establishing the session, that the first user is not one of a second plurality of users having access to the application server at the second time; and
    terminating the session based at least in part on the first user not having access to the application server at the second time.

12. An apparatus for managing sessions with an application server via an identity management system, comprising:
    one or more memories storing processor-executable code; and
    one or more processors coupled with the one or more memories and individually or collectively operable to execute the code to cause the apparatus to:
       receive, via an application protocol interface (API) of a cloud service of the identity management system, a first request for user access to an account of the application server, wherein the first request is associated with a first user of the account;
       transmit, via the API and in response to the first request, a second request for a secrets service associated with the identity management system to encrypt a password associated with the first user to a public key of a keypair, wherein the first request includes an indication of the public key;

receive, via the API and in response to the second request, a first message comprising the encrypted password, wherein the first message is received from the secrets service;

transmit, via the API in response to the first message, a second message comprising at least the encrypted password, wherein the second message is transmitted to an end-client that is associated with the identity management system and that has access to a private key of the keypair; and establish, at the end-client on behalf of the first user, a session for the account of the application server, wherein establishing the session is based at least in part on the end-client having access to the private key.

13. The apparatus of claim 12, wherein the end-client comprises a software client on a device associated with the first user.

14. The apparatus of claim 13, wherein the first request is associated with the first user of the account and includes the public key of the keypair, and wherein the session is established between the end-client and the application server based at least in part on the first request including the public key.

15. The apparatus of claim 12, wherein the end-client comprises a gateway associated with the identity management system.

16. The apparatus of claim 12, wherein the code is further executable by the one or more processors to cause the apparatus to:

determine, via the end-client, that the first user is one of a first plurality of users having access to the application server at a first time, wherein establishing the session is based at least in part on the first user having access to the application server at the first time.

17. A non-transitory computer-readable medium storing code for managing sessions with an application server via an identity management system, the code comprising instructions executable by one or more processors to:

receive, via an application protocol interface (API) of a cloud service of the identity management system, a first request for user access to an account of the application server, wherein the first request is associated with a first user of the account;

transmit, via the API and in response to the first request, a second request for a secrets service associated with the identity management system to encrypt a password associated with the first user to a public key of a keypair, wherein the first request includes an indication of the public key;

receive, via the API and in response to the second request, a first message comprising the encrypted password, wherein the first message is received from the secrets service;

transmit, via the API in response to the first message, a second message comprising at least the encrypted password, wherein the second message is transmitted to an end-client that is associated with the identity management system and that has access to a private key of the keypair; and establish, at the end-client on behalf of the first user, a session for the account of the application server, wherein establishing the session is based at least in part on the end-client having access to the private key.

18. The non-transitory computer-readable medium of claim 17, wherein the end-client comprises a software client on a device associated with the first user.

19. The non-transitory computer-readable medium of claim 17, wherein the end-client comprises a gateway associated with the identity management system.

20. The non-transitory computer-readable medium of claim 17, wherein the instructions are further executable by the one or more processors to:

determine, via the end-client, that the first user is one of a first plurality of users having access to the application server at a first time, wherein establishing the session is based at least in part on the first user having access to the application server at the first time.

* * * * *